(12) United States Patent
Pompa et al.

(10) Patent No.: US 11,441,818 B2
(45) Date of Patent: Sep. 13, 2022

(54) ROOF MOUNTED SUPPORT ASSEMBLY

(71) Applicant: SafeConnect Solar, Inc., Honolulu, HI (US)

(72) Inventors: Jon Pompa, Long Beach, CA (US); Brian Cunningham, Wilbraham, MA (US); Eric Wilhelm, Honolulu, HI (US); Todd Georgopapadakos, Palo Alto, CA (US)

(73) Assignee: SafeConnect Solar, Inc., Honolulu, HI (US)

( * ) Notice: Subject to any disclaimer, the term of this patent is extended or adjusted under 35 U.S.C. 154(b) by 0 days.

(21) Appl. No.: 17/224,837

(22) Filed: Apr. 7, 2021

(65) Prior Publication Data

US 2021/0318032 A1    Oct. 14, 2021

Related U.S. Application Data

(60) Provisional application No. 63/006,890, filed on Apr. 8, 2020.

(51) Int. Cl.
| | |
|---|---|
| *F24S 25/634* | (2018.01) |
| *H02S 20/23* | (2014.01) |
| *H02S 30/00* | (2014.01) |
| *F24S 25/70* | (2018.01) |

(Continued)

(52) U.S. Cl.
CPC ............ *F24S 25/634* (2018.05); *F24S 25/70* (2018.05); *H02S 20/23* (2014.12); *H02S 30/00* (2013.01); *F24S 25/35* (2018.05); *F24S 2025/6003* (2018.05); *F24S 2025/6007* (2018.05);

(Continued)

(58) Field of Classification Search
CPC .......... F24S 25/35; F24S 25/70; F24S 25/634; F24S 2025/6003; F24S 2025/6007; H02S 20/23; H02S 30/00; Y02B 10/10; Y02B 10/20; Y02E 10/47; Y02E 10/50
See application file for complete search history.

(56) References Cited

U.S. PATENT DOCUMENTS

| 9,249,813 | B2 * | 2/2016 | Kalman | ............... B64C 1/066 |
| 10,036,576 | B1 * | 7/2018 | Robinson | .............. F24S 25/632 |
| 10,090,800 | B2 * | 10/2018 | McPheeters | ............ H02S 20/23 |

(Continued)

FOREIGN PATENT DOCUMENTS

| CN | 204031050 U | * | 12/2014 |
| CN | 204481747 U | * | 7/2015 |

(Continued)

*Primary Examiner* — Jessie T Fonseca
(74) *Attorney, Agent, or Firm* — Polsinelli PC

(57) ABSTRACT

A mounting system includes a footer having a cavity section and a cover section. The cavity section includes: a base and a first patterned wall extending upward from the base to at least partially define a cavity; and a hole for receiving a connector to attach the footer to a fixed surface. The cover section is releasably attachable to the cavity section and has a second patterned wall. An intermediate support has a stem and a head, at least two sides of the stem have a pattern, the head having at least one support surface shaped to supporting an object and a lock configured to secure the object to the head. The first patterned wall, the second patterned wall and the pattern on the two sides of the stem collectively define a plurality of defined height and width positions for the intermediate support to align relative to the footer.

20 Claims, 30 Drawing Sheets

(51) Int. Cl.
*F24S 25/35* (2018.01)
*F24S 25/60* (2018.01)

(52) U.S. Cl.
CPC .............. *Y02B 10/10* (2013.01); *Y02B 10/20* (2013.01); *Y02E 10/47* (2013.01); *Y02E 10/50* (2013.01)

(56) References Cited

U.S. PATENT DOCUMENTS

| | | | | |
|---|---|---|---|---|
| 10,218,305 | B1* | 2/2019 | Schrock | F16B 5/123 |
| 10,340,838 | B2* | 7/2019 | Schuit | F24S 25/35 |
| 10,605,282 | B1* | 3/2020 | Young | F16B 5/025 |
| 10,727,780 | B2* | 7/2020 | Kobayashi | E04D 13/158 |
| 11,205,990 | B2* | 12/2021 | Stearns | E04D 13/1407 |
| 2011/0260027 | A1* | 10/2011 | Farnham, Jr. | F24S 25/636 |
| | | | | 248/309.1 |
| 2013/0048816 | A1* | 2/2013 | Wentworth | F24S 25/61 |
| | | | | 248/237 |
| 2013/0340358 | A1* | 12/2013 | Danning | H02S 20/23 |
| | | | | 52/126.7 |
| 2015/0316086 | A1* | 11/2015 | Urban | F24S 25/65 |
| | | | | 403/374.3 |
| 2016/0268958 | A1* | 9/2016 | Wildes | F24S 25/70 |
| 2017/0063288 | A1* | 3/2017 | Schuit | F24S 25/63 |
| 2019/0006982 | A1* | 1/2019 | Pretorius | F16B 5/0628 |
| 2019/0013772 | A1* | 1/2019 | Bamat | F16B 5/0028 |
| 2019/0068110 | A1* | 2/2019 | McPheeters | F24S 25/70 |
| 2019/0190437 | A1* | 6/2019 | Kobayashi | F24S 25/632 |
| 2020/0116191 | A1* | 4/2020 | Uppu | H02S 20/23 |
| 2020/0313604 | A1* | 10/2020 | Harris | H02S 20/23 |
| 2021/0328540 | A1* | 10/2021 | Wentworth | F24S 25/33 |

FOREIGN PATENT DOCUMENTS

| | | | | | |
|---|---|---|---|---|---|
| CN | 105281645 | A | * | 1/2016 | |
| CN | 105932942 | A | * | 9/2016 | |
| CN | 208251487 | U | * | 12/2018 | |
| CN | 209330014 | U | * | 8/2019 | |
| CN | 112260628 | A | * | 1/2021 | |
| DE | 102010054175 | A1 | * | 6/2012 | ............ H02S 20/23 |
| DE | 102012011969 | A1 | * | 9/2013 | ........... H01L 31/042 |
| DE | 102015117537 | B3 | * | 12/2016 | ............ H02S 20/22 |
| WO | WO-2013032470 | A1 | * | 3/2013 | ............. F24S 25/70 |

* cited by examiner

250

ROOF MOUNTED SUPPORT ASSEMBLY

CROSS REFERENCE TO RELATED APPLICATIONS

The instant application claims priority to U.S. Provisional Patent Application 63/006,890 entitled ROOF MOUNTED SUPPORT ASSEMBLY filed Apr. 8, 2020, the contents of which are incorporated by reference herein in its entirety.

FIELD OF THE INVENTION

Various embodiments described herein relate generally to the installation of roof top mounted equipment, such as solar panels. More particularly, various embodiments herein relate to a methodology for installing solar panels on rooftops that minimizes or eliminates the need for specialized training or knowledge in mounting of electrical power systems.

BACKGROUND

Solar technology presents a viable green source of energy as an alternative to fossil fuels. This is particularly the case for geographic areas that have a high amount of daylight and/or higher than average fuel costs, such as Hawaii, California, N.Y., etc.

An ongoing obstacle to the adoption of solar panels as a home energy solution remains the expense, particularly in the purchase of the components and the installation. A typical residential solar system will include a number of solar panels mounted on a roof and connected by electrical cables to a junction box. The output of the junction box is then fed to load distribution center for internal use. Electrical cable between the solar panels and the junction box are cut to length, and spliced ends of the wires are connected to terminals using generally known methodologies familiar to the field of electricians.

A drawback of the above system is that consumers are not familiar with the installations process and are not experts in mounting systems, and may mount the panels incorrectly if they attempted to install them without professional assistance. Jurisdictions thus often require professional installers to install solar panel systems to ensure safe and proper installation, which adds to the overall installation costs. Jurisdictions also impose plan review and inspection requirements, which further add to overall installation costs.

DRAWINGS

Various embodiments in accordance with the present disclosure will be described with reference to the drawings, in which.

DETAILED DESCRIPTION

Figure 1:
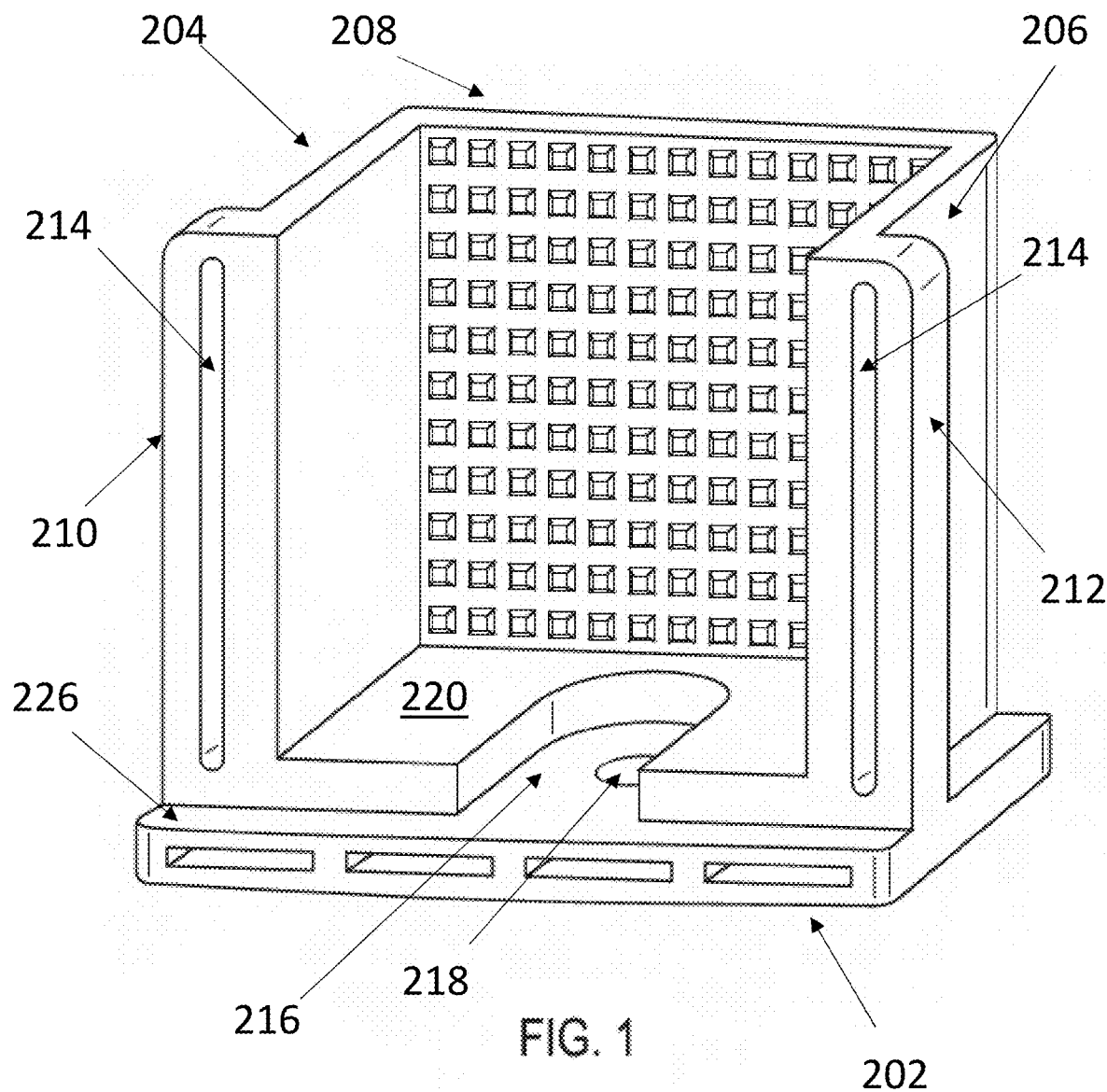
FIG. 1 is a perspective view of a cavity section of a footer according to an embodiment of the invention.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., are labels to distinguish components or blocks of otherwise similar names, but does not imply any sequence or numerical limitation. When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure.

Shapes as described herein are not considered absolute. As is known in the art, surfaces often have waves, protrusions, holes, recesses, etc. to provide rigidity, strength, functionality and/or natural variances from the manufacturing process. All recitations of shape (e.g., cylindrical) herein are to be considered modified by "substantially" regardless of whether expressly stated in the disclosure or claims, and specifically accounts for variations in the art as noted above.

A frustum is a rectangular or square base pyramid shape with the tops sheared off. Frustums may be present in certain embodiments as either projections or grooves.

Dimensions of components in the drawings are to scale unless otherwise noted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

Figure 15:
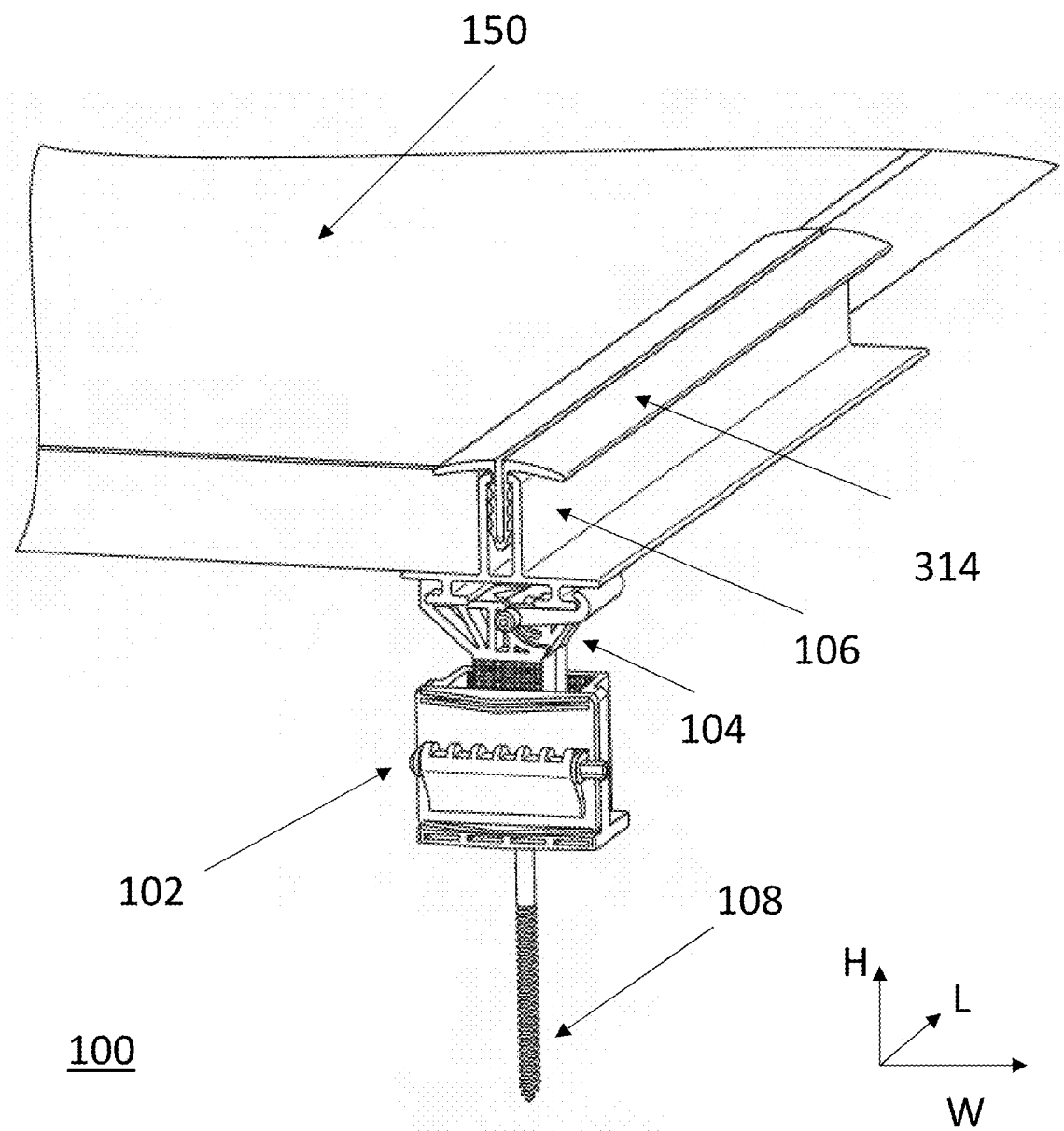
FIG. 15 is a perspective view of an assembled configuration of a mounting system according to an embodiment of the invention.

Referring now to FIG. 15, a mounting system 100 is shown supporting a mounted object such as a solar panel 150. Mounting system 100 may include a footer 102, an intermediate support 104, and an upper support 106. Footer 102 connects to a support surface (not shown, typically a roof, although the invention can be used on any support surface) via a connector such as a lag bolt 108 connecting it to an underlying beam (not shown). The footer 102 may be supported on the support surface directly (without intervening components) or indirectly (with intervening components, such as by way of non-limiting example roof flashing materials to prevent water penetration).

Figure 2:
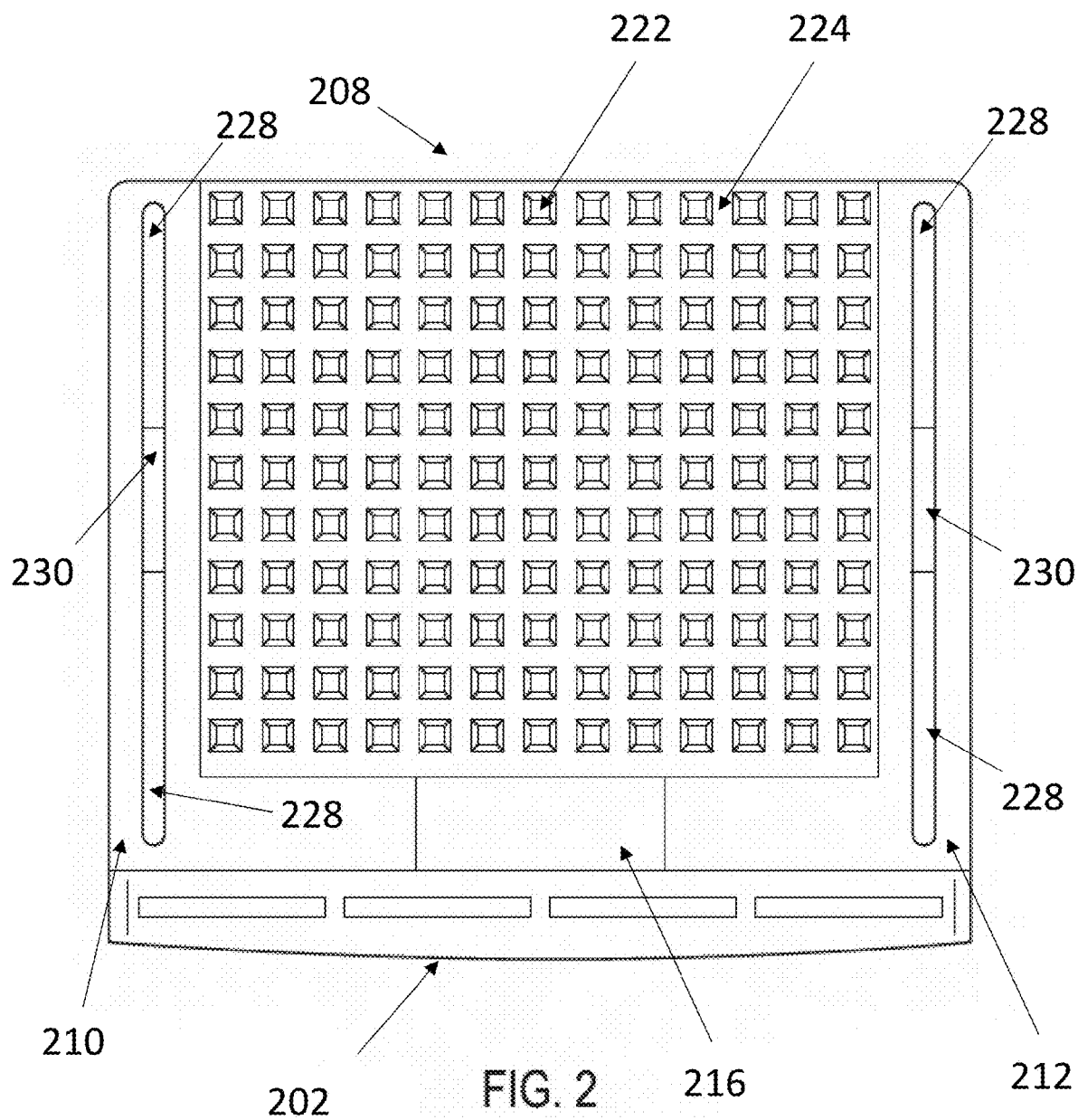
FIG. 2 is an interior view of a cavity section of a footer according to an embodiment of the invention.
Figure 3:
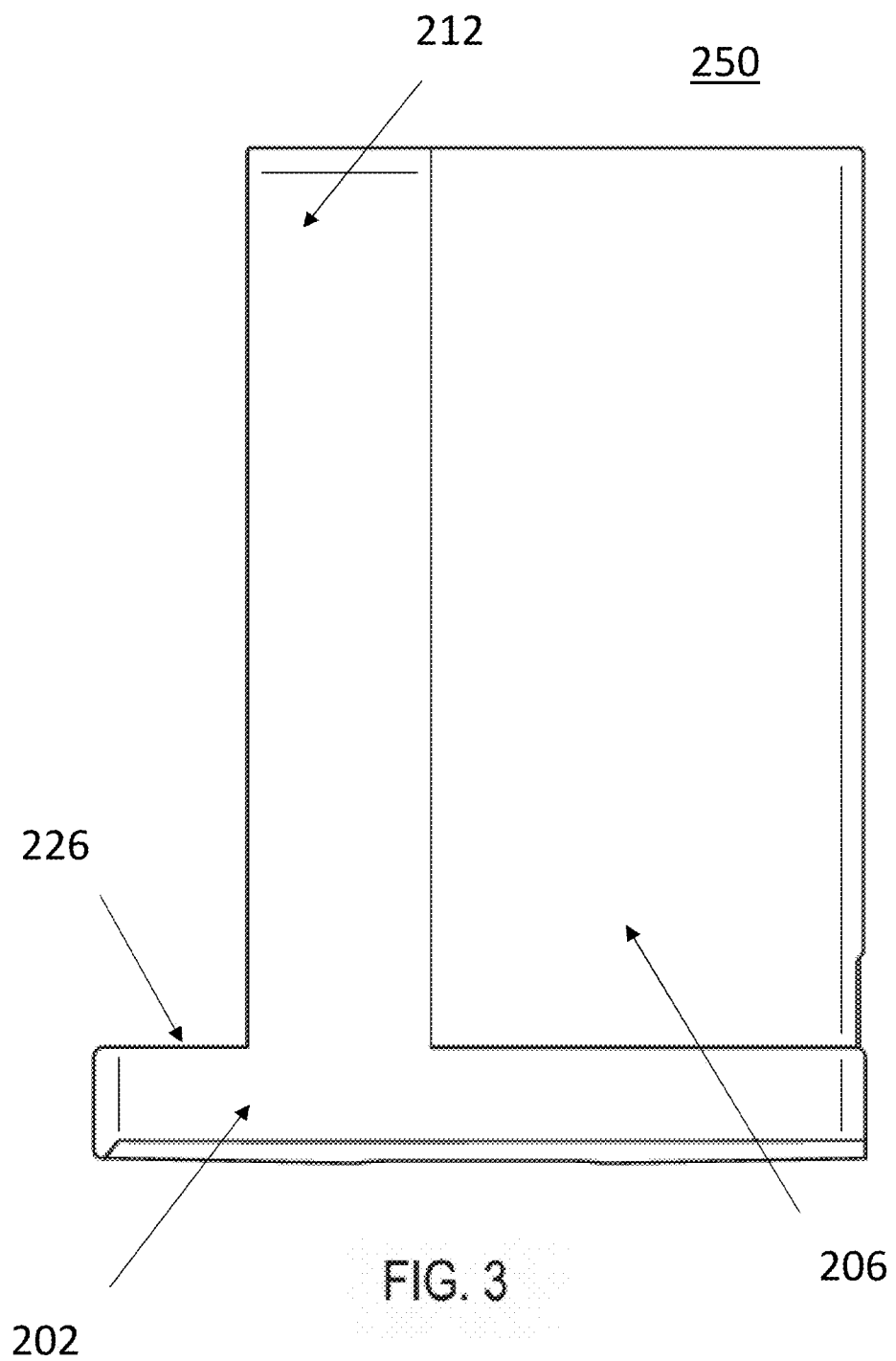
FIG. 3 is a side view of a cavity section of a footer according to an embodiment of the invention.
Figure 4:
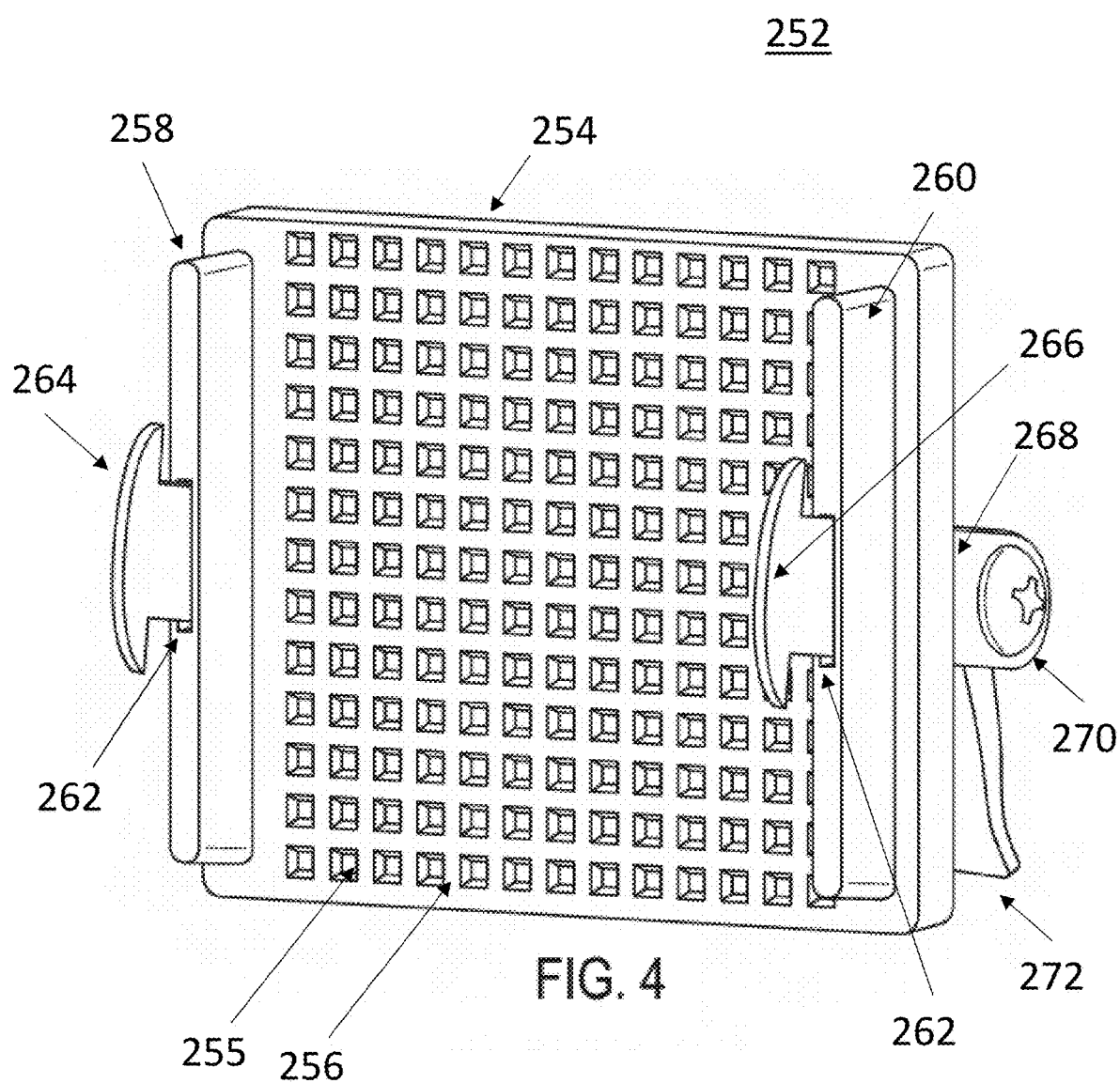
FIG. 4 is a perspective view of a cover section of a footer according to an embodiment of the invention.
Figure 5:
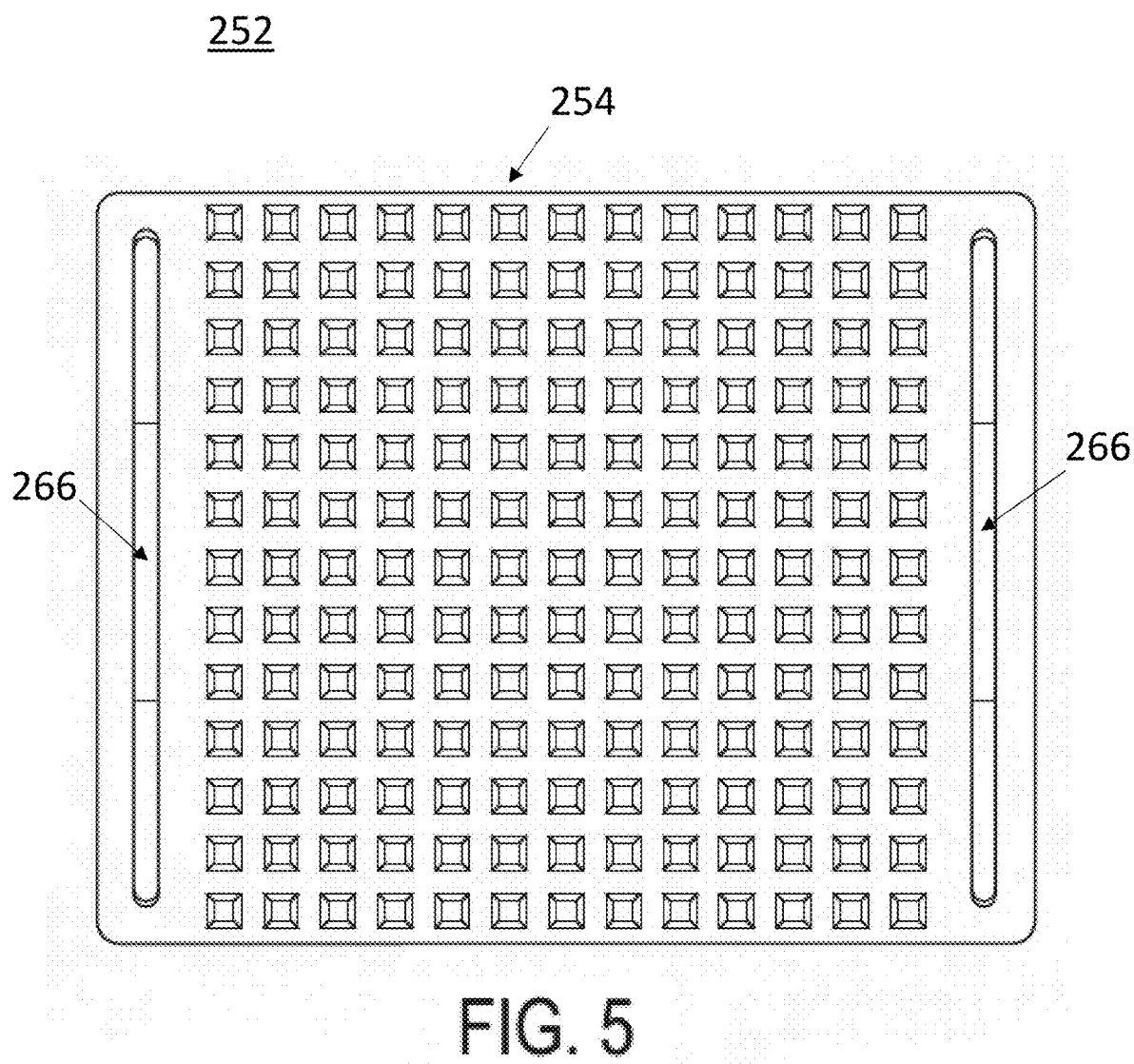
FIG. 5 is an interior view of a cover section of a footer according to an embodiment of the invention.

Referring now to FIGS. 1-8, an embodiment of footer 102 is shown in more detail. Footer 102 includes a cavity section 250 and a cover section 252. FIGS. 1-3 show the cavity section 250, FIGS. 4-8 show the cover section 252, and FIGS. 9-12 show both in their attached configuration to define footer 102.

Referring now to FIGS. 1-3, cavity section 250 has a base 202, two lateral side walls 204 and 206, and a center wall 208. Walls 204, 206 and 208 are fixed relative to the base 202, and may be integrally formed or attached thereto. The interior surfaces of walls 204, 206 and 208 define an interior cavity 220.

A first flange 210 extends laterally from the end of wall 204. A second flange 212 extends laterally from the end of wall 206. Each flange 210 and 212 has a slot 214. Slot 214 has an interior rear wall 228 that defines an internal cavity in each of flanges 210 and 212. The interior rear wall 228 has an opening 230 to allow full pass through of slot 214 in that region.

Base 202 may have a recess 216 and a central hole 218 configured to receive lag bolt 108 to secure footer 102 into the support surface. Additional holes may also be provided to receive other connectors.

Base 202 may extend further forward that walls 204 and 206 to define a ledge 226 that can support cover section 252 as discussed below.

The inner side of wall 208 is populated with a first pattern of projections 222 and/or grooves 224. The pattern shown in the figures is a "waffle" shape of rows and columns of square frustums projections, and the spaces between frustums serve as grooves. However, the invention is not limited to any specific patterns or shapes.

Referring now to FIGS. 4-8, cover section 252 is shown in an unassembled state independent from cavity section 250. A cover wall 254 has an inner side populated with a second pattern of projections 255 and/or grooves 256. The second pattern may match the first pattern of wall 208, and is shown in the figures as a "waffle" shape of rows and columns of square frustums (pyramids with tops sheared off) projections, and the spaces there between serve as grooves. However, the invention is not limited to any specific patterns or shapes, and the first pattern need not be identical to the second pattern of wall 208.

Extensions 258 and 260 extend from cover wall 254. As discussed in more detail below, when in a full assembled state, extensions 258 and 260 will insert into slots 214 of flanges 212 and 210, respectively.

Slots 262 extends through each of extensions 258 and 260, and through cover wall 254. As discussed in more detail below, when in a full assembled state, slots 262 align with openings 230 of cavity section 250.

Pins 264, which may be flat, extend through slots 262. Each flat pin 264 has head 266, an intermediate shaft 268 and an end 270 with a hole (shown as occupied by connecting rod 274).

On the outer side of wall 254, a cam lever 272 having a cam surface 273 is rotatably mounted onto the ends 270 of two pins 264 via a connecting rod 274. Connecting rod 274 may be any suitable attachment such as pin, bolt or screw going through the entire cam lever 272, an integral extension from cam lever 272, or a combination thereof. The invention is not limited to the nature of connecting rod 274 or the manner of attachment of cam lever 272.

Figure 6:
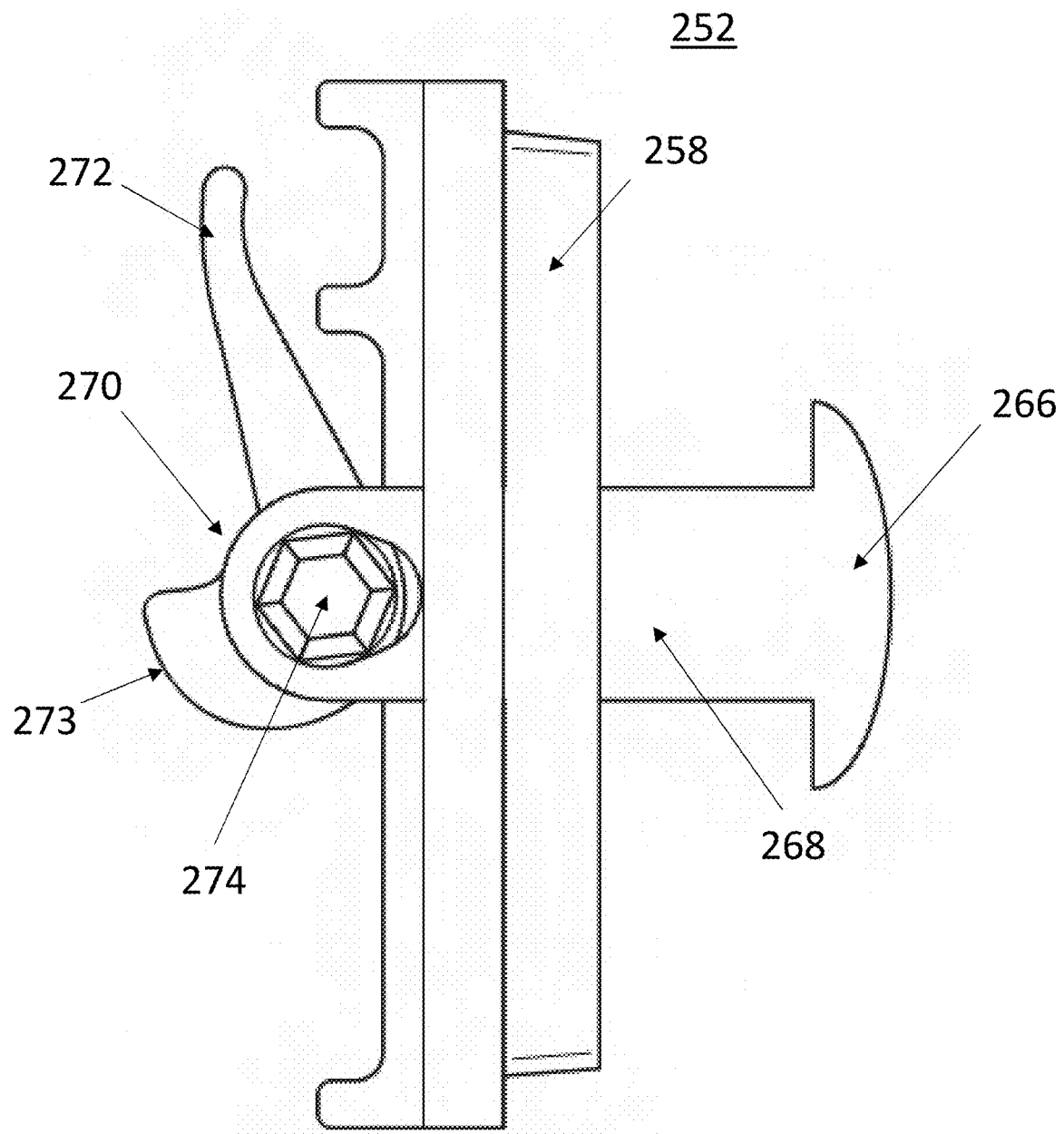
FIG. 6 is a side view of a cover section of a footer configured in an open position according to an embodiment of the invention.
Figure 7:
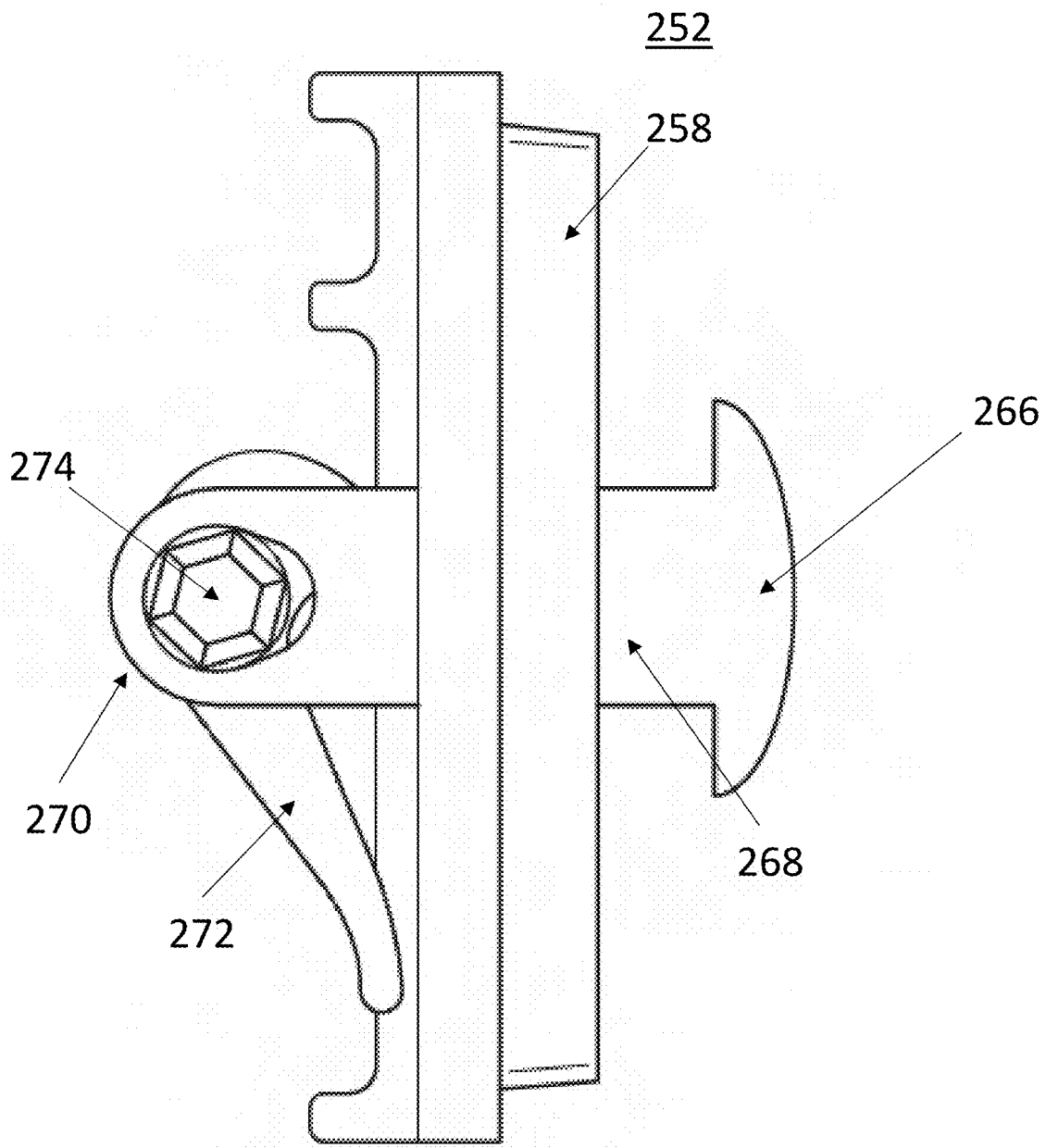
FIG. 7 is a side view of a cover section of a footer configured in a closed position according to an embodiment of the invention.
Figure 8:
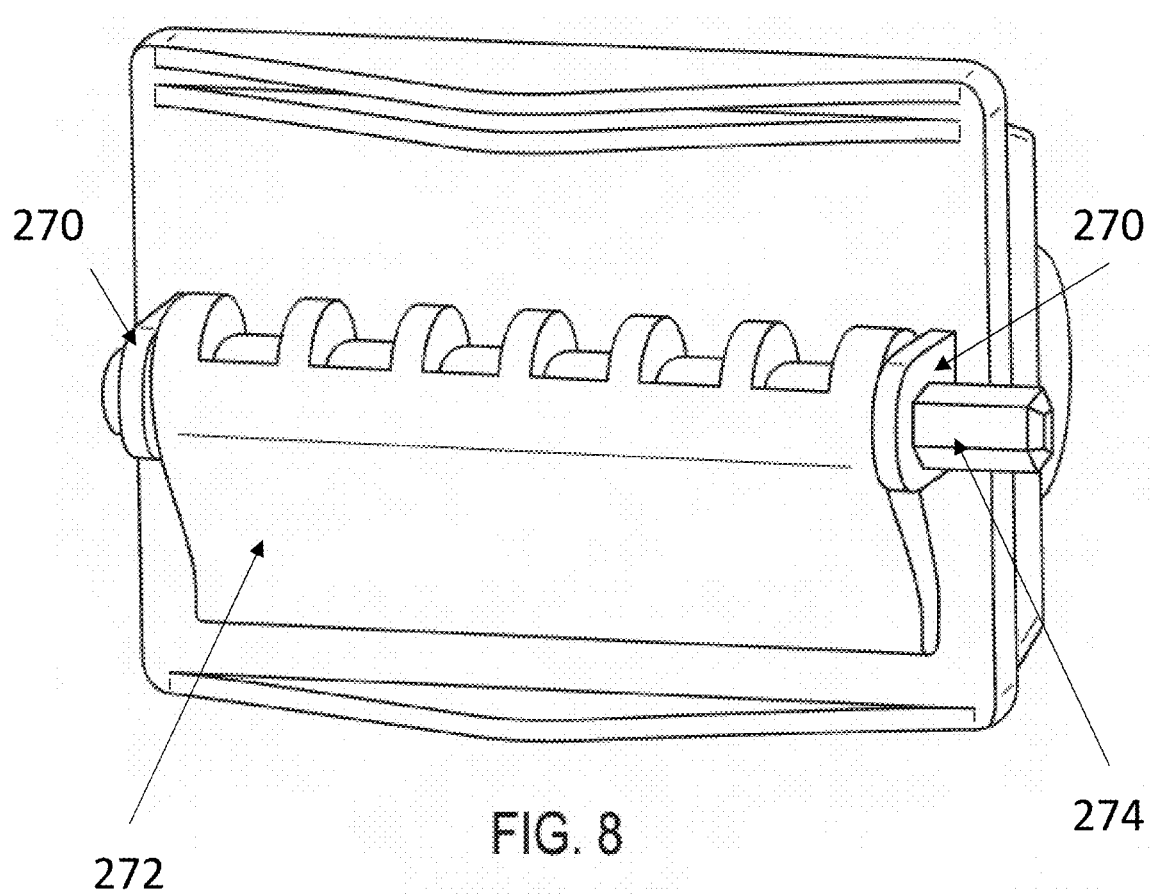
FIG. 8 is a perspective view of a cover section of a footer configured in a closed position according to an embodiment of the invention.

Cam lever 272 is rotatable between an open position and a closed position. When moving to the open position the cam surface 273 of cam lever 272 will push head 266 of pins 264 away from cover wall 254, such as shown in FIG. 6. When moving to the closed the cam surface 273 of cam lever 272 will pull head 266 of pins 264 toward cover wall 254, such as shown in FIG. 7.

Referring now to FIGS. 9-12, cavity section 250 and cover section 252 are shown in their combined assembled state to form footer 102. For the assembly, cover wall 254 is placed on ledge 226 such that slots 262 align with openings 230. Pins 264 are inserted through slots 262 and openings 230; head 266 is larger than opening 230, such that head 266 acts as stopper against the sides of flanges 210 and 212. Cam lever 272 is aligned with the holes in the ends 270 of pins 264, and a suitable connecting rod 274 is inserted through the holes to lock the entire assembly into place.

Figure 9:
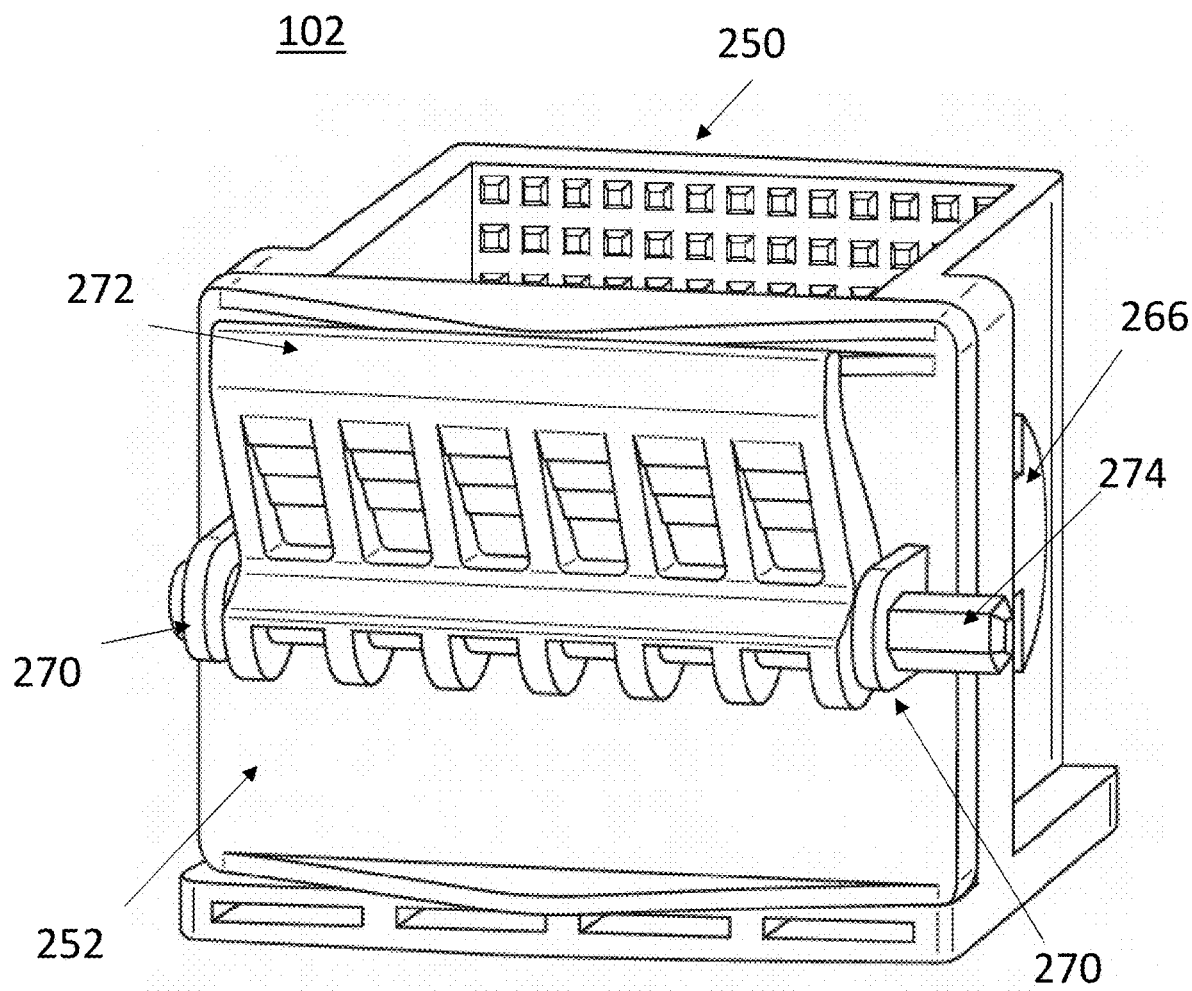
FIG. 9 is a perspective view of a footer configured in an open position according to an embodiment of the invention.
Figure 11:
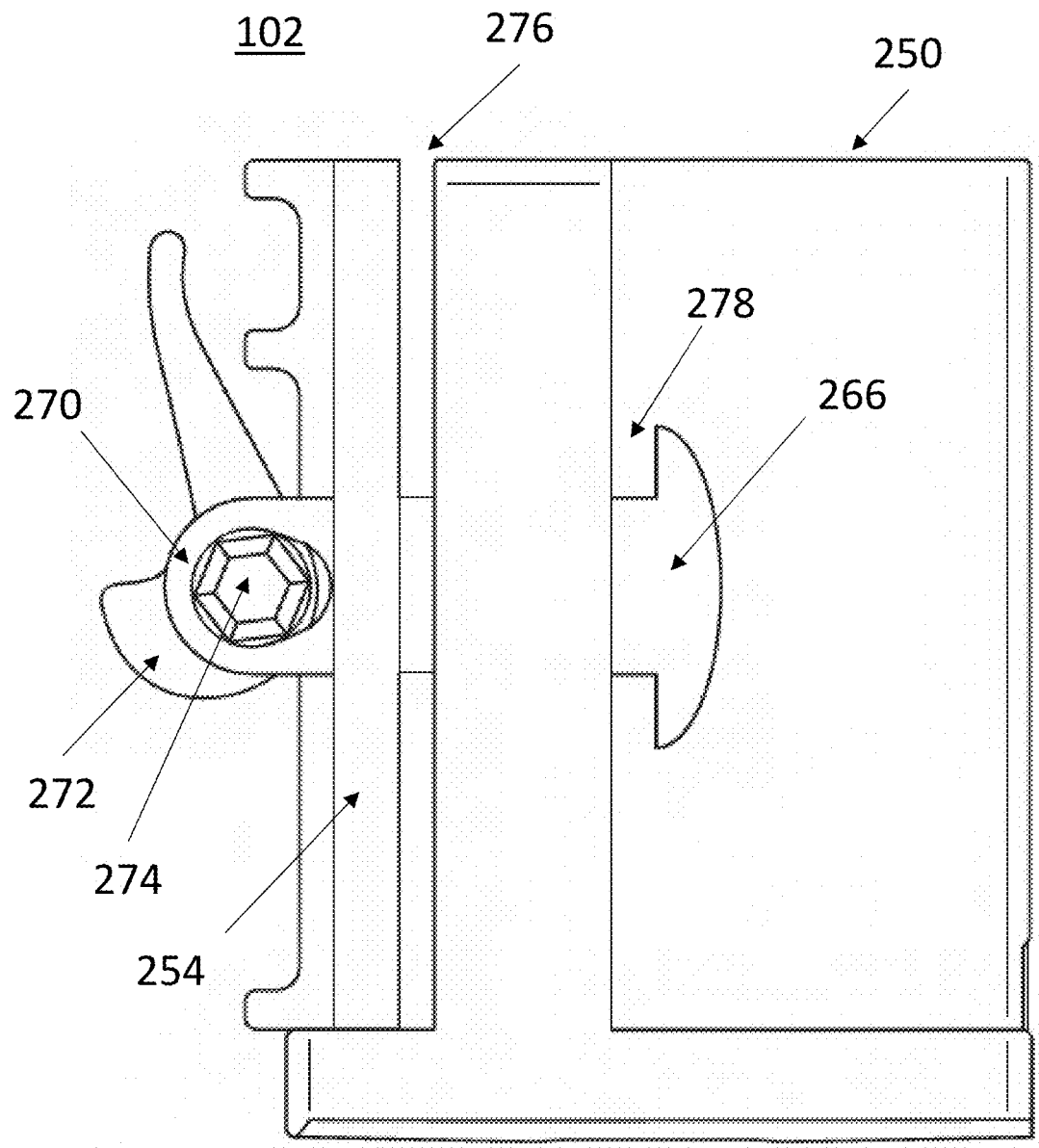
FIG. 11 is a side view of a footer configured in an open position according to an embodiment of the invention.

Rotation of cam lever 272 will lock or unlock cover wall 254 against flanges 210 and 212. As shown in FIGS. 9 and 11, when cam lever 272 is in the open position, cover wall 254 is loosely connected to cavity section 250 to define an open configuration. There may be a gap 276 between cover wall 254 and flanges 210/212, and/or a gap between heads 266 and flanges 210/212. Cover wall 254 can be moved away from flanges 210/212 until the heads 266 abut flanges 210/212; this defines the maximum separation of the cover section 252 from the cavity section 252, for which the corresponding distance between cover wall 254 and wall 208 defines a maximum length of cavity 220.

Figure 10:
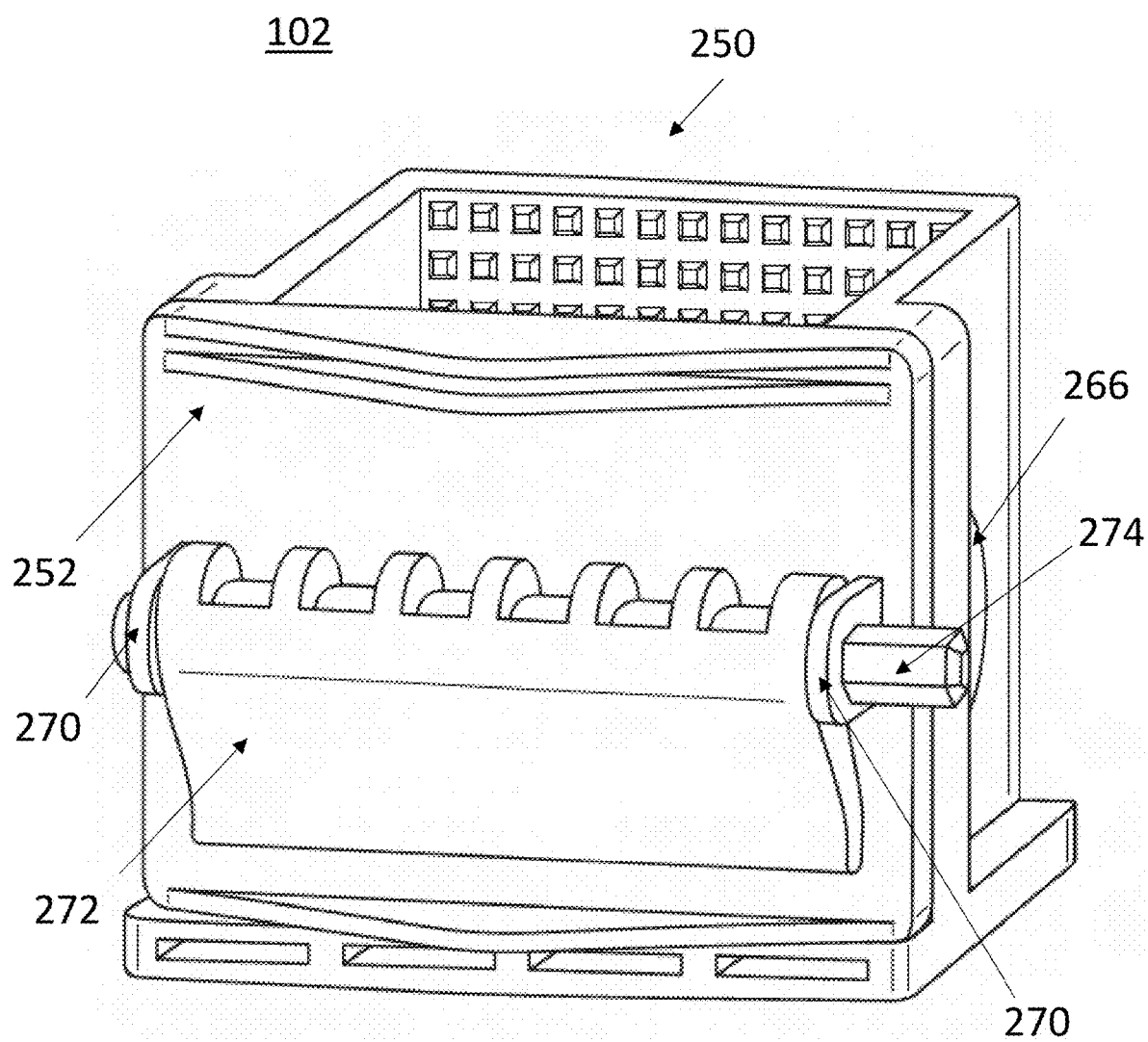
FIG. 10 is a perspective view of a footer configured in a closed position according to an embodiment of the invention.
Figure 12:
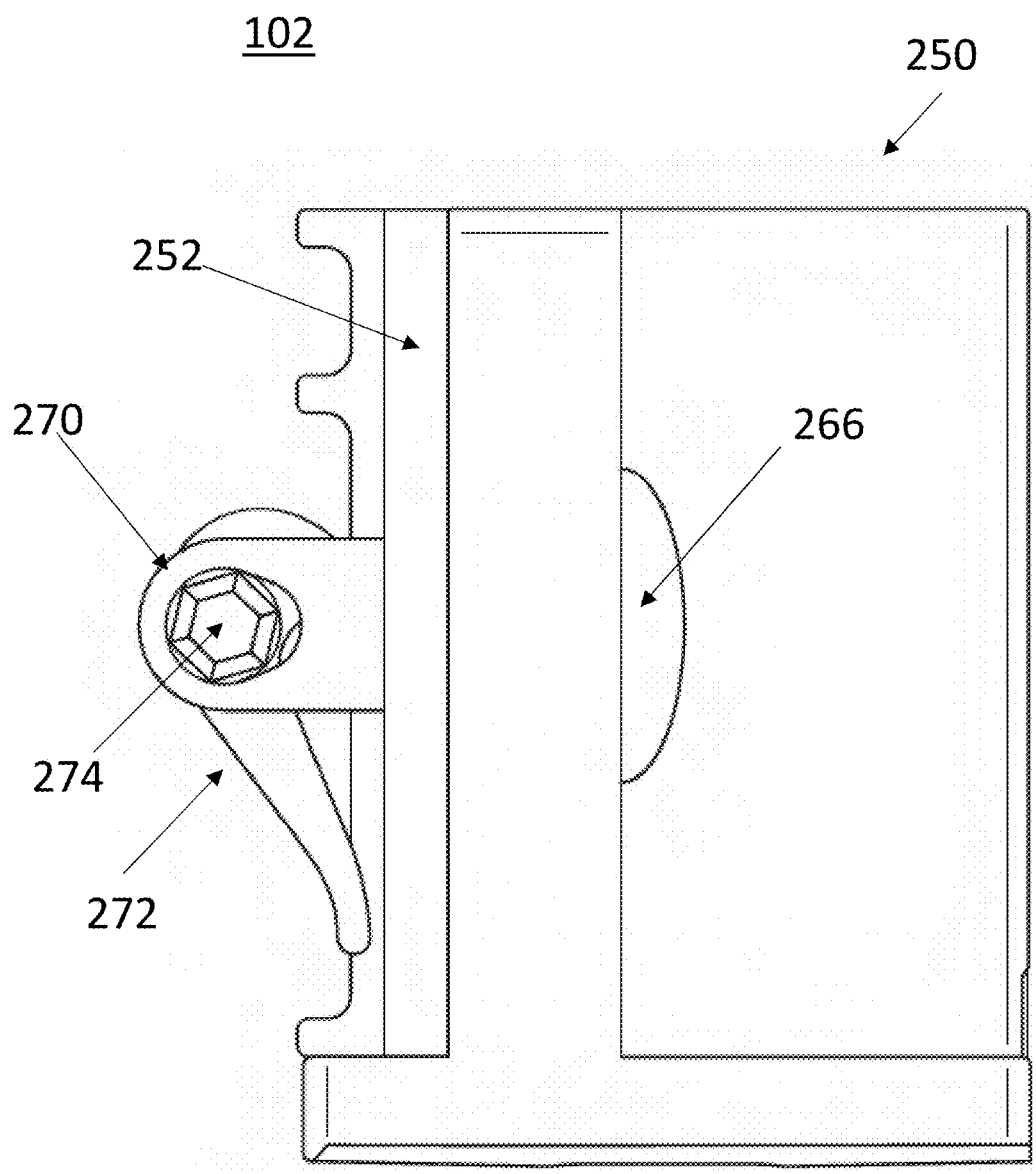
FIG. 12 is a side view of a footer configured in a closed position according to an embodiment of the invention.

As shown in FIGS. 10 and 12, when moving to the closed position the cam surface 273 of cam lever 272 will pull head 266 of pins 264 toward flanges 210 and 212 until they abut. Thus in turn pushes cover wall 254 to forcibly abut flanges 210/212 of cavity section 250. This forms a closed configuration of footer 102 for which cam lever 272 is a lock. Any object of appropriate shape and size within cavity 220 will be clamped therein, and moving cam lever 272 back to the open position will release the clamping pressure and allow the object to be removed.

Figure 13:
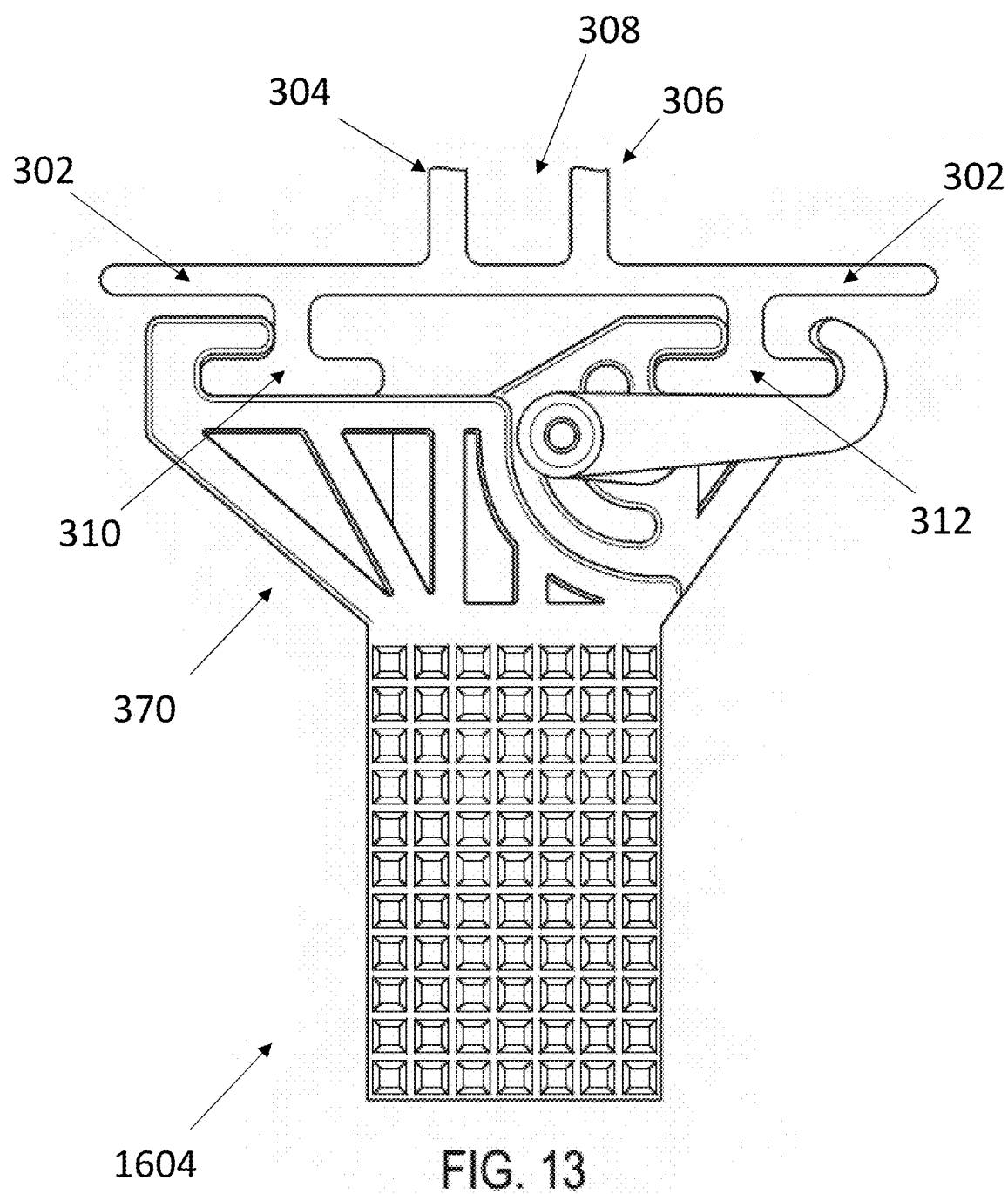
FIG. 13 is a side view of an intermediate support and upper support in a locked configuration according to an embodiment of the invention.
Figure 14:
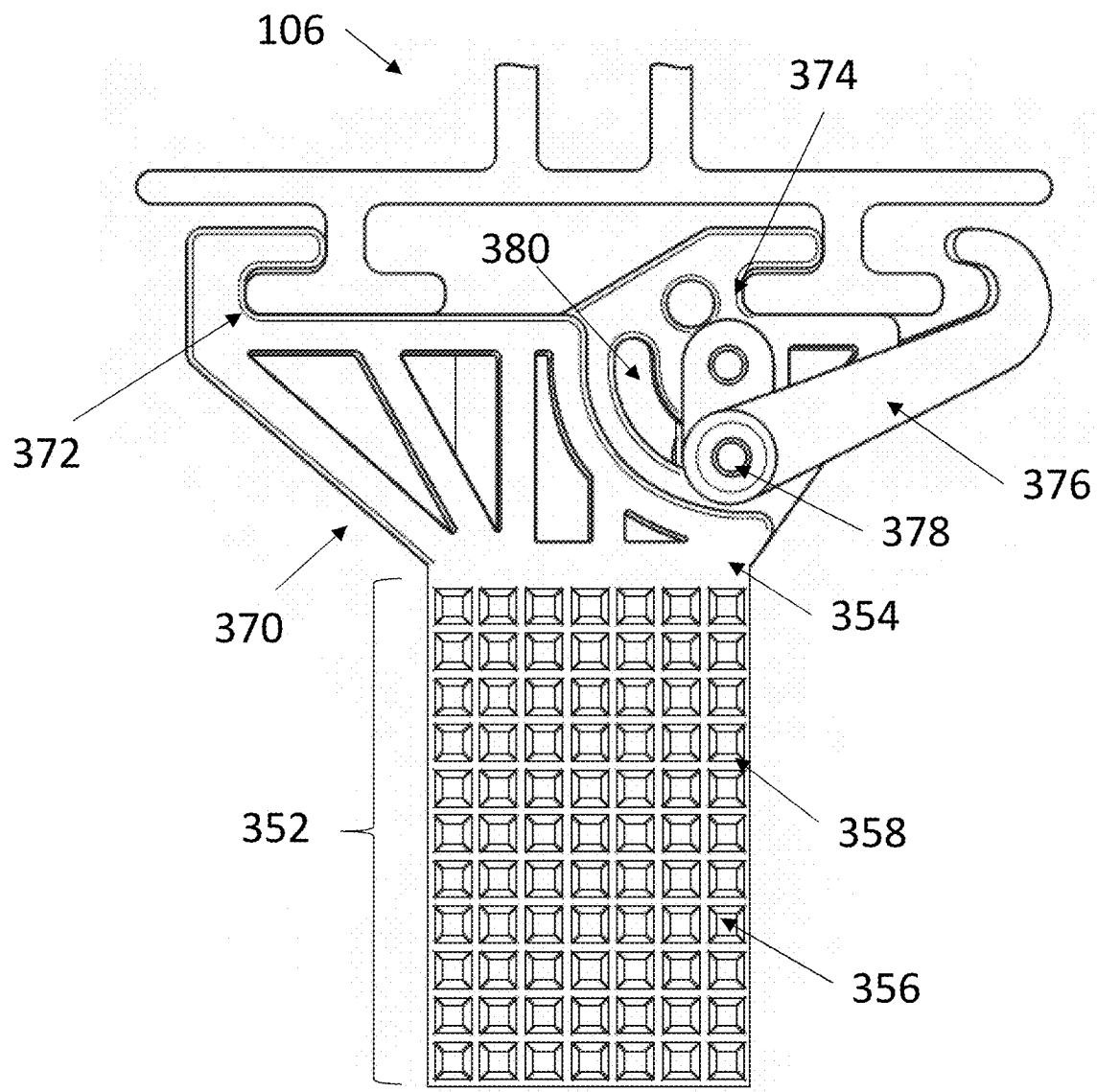
FIG. 14 is a side view of an intermediate support and upper support in an unlocked configuration according to an embodiment of the invention.

Referring now to FIGS. 13-15, an embodiment of intermediate support 104 and upper support 106 is shown in more detail. Intermediate support 104 includes a stem 352 and an upper head portion 370 that engages with upper support 106.

Upper support 106 includes a panel support surface 302 and upper walls 304 and 306. Upper walls 304 and 306 extend upward from panel support surface 302 to define a cavity 308 there between. Two I-beams 310 and 312 extend downward from each panel support surface 302. Referring specifically to FIG. 15, a solar panel 150 can be mounted on panel support surface 302 and the adjacent wall 304/306, and secured in place via a barbed cap 314 inserted into cavity 308.

Turning to intermediate support 104, stem 352 has at least four sides. Two opposing sides 354 (only one side is shown) have a predetermined pattern of grooves 356 and/or projections 358 that are sized, shaped and positioned to mate with the projections and grooves of walls 208 and 254 of footer 102. A non-limiting example of the predetermined pattern is a waffle shape with the square frustum grooves in columns and rows, although the invention is not limited to any particular shape. The predetermined pattern may be uniform or non-uniform; by way of non-limiting example, the portions of the pattern on the two opposing sides 354 may be the same or different.

The distance between the two opposing sides 354, referred to for reference as the length, is such that when inserted into footer 102 and the cam lever 272 is moved into the closed position, the pattern of sides 354 will tightly mate with the pattern of the inner facing surfaces of walls 208 and 254, such that the lock provided by cam lever 272 locks stem 352 into position relative to footer 102. When footer 102 is secured by lag bolt 110 to a support surface, then stem 352 is effectively locked and mounted into place when cam lever 272 is closed. Opening cam lever 272 allows cover wall 254 to move outward, thereby expanding the cavity 220 of footer 102 such that stem 352 can removed.

The width of stem 352 may be greater than its length, and in particular larger than the length of cavity 220 even in its most open position. With these size parameters, stem 352 could only be inserted into cavity 220 when the patterns of sides 354 and walls 208 and 254 are properly oriented toward each other. If stem 352 were in a different orientation, the stem would be too big to fit into cavity 220. This avoids insertion of stem 352 at an improper orientation. However the invention is not so limited, and other sizes could be used.

The width of stem 352 may be smaller than the width of cavity 220. This provides a degree of play and flexibility in the specific lateral placement in the width direction of stem 352 within cavity 220. In some embodiments, the waffle pattern of stem 352 has 7 columns and the waffle pattern of walls 208 and 254 have 13 columns, which gives six different defined width positions possibilities.

Stem 352 may be height adjustable relative to footer 102. When in its lowest position, stem 352 may be largely within cavity 220 while upper head portion 370 is above footer 102. In some embodiments, the waffle pattern of stem 352 has 11 rows and the waffle pattern of walls 208 and 254 also have 11 rows, which gives 10 different defined height positions possibilities, although as a practical matter there may be a recommended minimum of overlapping rows (e.g., at least 3 rows) to ensure a tight grip.

Between the rows and the columns, there may be dozens of different combinations of height/width orientations to allow for custom placement of intermediate support 104 in footer 102.

Upper head portion 370 extends laterally away from stem 352 to define first and second receiving cavities 372 and 374 with supporting surfaces. The size, shape and position of the first and second receiving cavities 372 and 374 will accommodate the I-beams 310 and 312 of the upper support 106. A lock is provided by a hook 376 rotatably mounted on an axle 378 extending through an arcuate slot 380 in upper head portion 370; FIG. 13 shows hook 376 in the closed position, and FIG. 14 shows hook 376 in the open position.

For installation, stem 352 is placed inside footer 102. With the hook 376 in the open position as shown in FIG. 13, upper support 106 is installed on upper head portion 370 as shown in FIGS. 13 and 14 by inserting the I-beams 310 and 312 into first and second receiving cavities 372 and 374. Hook 376 is then locked into place as shown in FIG. 14, thereby attaching the upper support 106 to the intermediate support 104. The height and lateral position of stem 352 relative to footer 102 is adjusted by hand to the desired position, whereupon cam lever 272 is closed to lock the intermediate support 104 in place. Once solar panel 150 is mounted on upper support 106, cap 314 is inserted into the cavity 308 to hold the panel in place.

The cam lever 272 and/or the hook 376 can later be opened to adjust the position of the components, or to disassemble the connection.

Patterns on the walls 208 and 254 may be identical and symmetrical so that stem 352 may be reversible when inserted. However, the patterns may be different, which may limit stem 352 to one orientation for proper installation.

Figure 16:
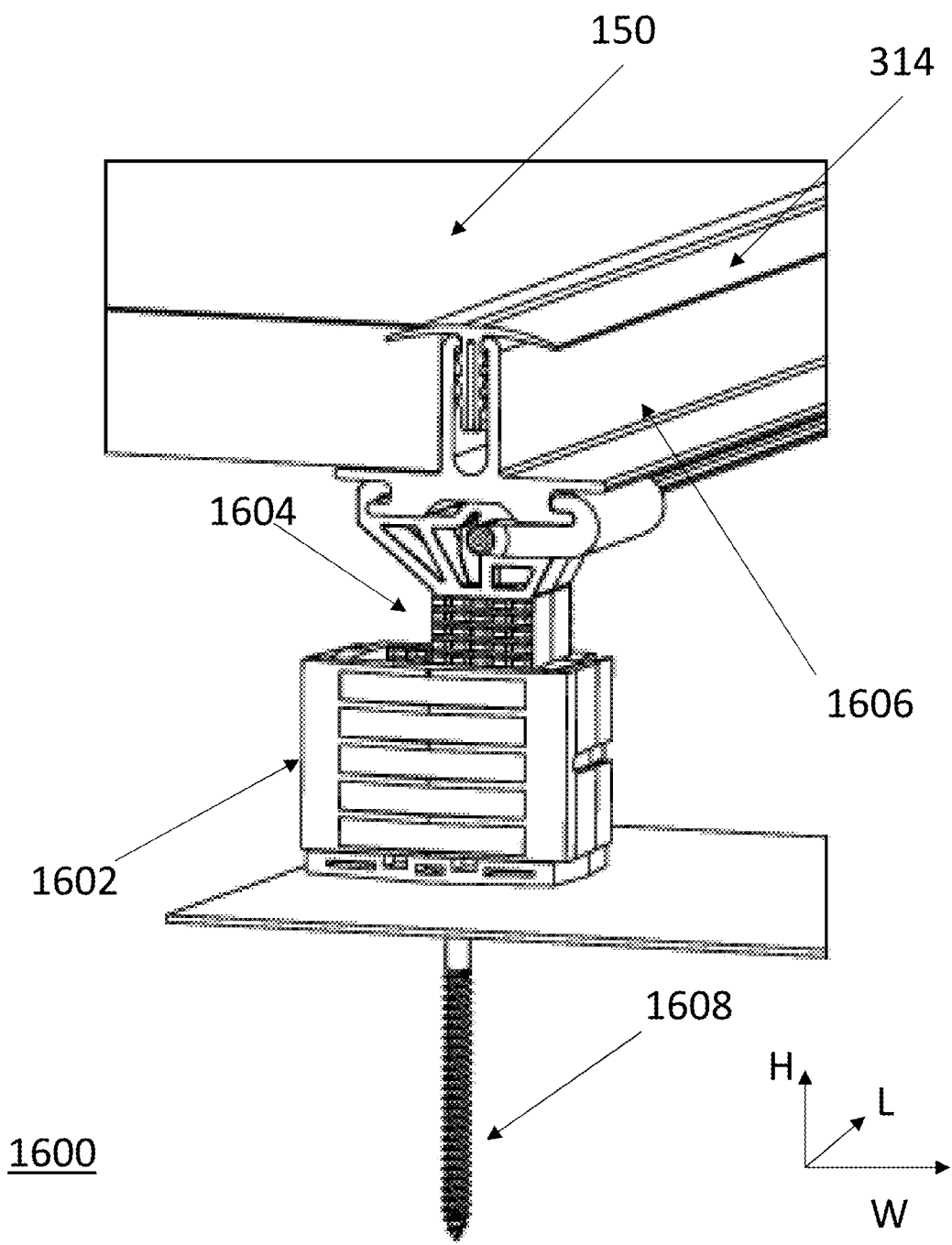
FIG. 16 is a perspective view of an assembled configuration of a mounting system according to an embodiment of the invention.

Referring now to FIG. 16, a mounting system 1600 is shown supporting a mounted object such as a solar panel 150. Mounting system 1600 may include a footer 1602, an intermediate support 1604, and an upper support 1606. Footer 1602 connects to a fixed support surface (not shown, typically a roof, although the invention can be used on any support surface) having sufficient rigidity and strength via a connector such as a lag bolt 1608 connecting footer 1602 to an underlying beam in the roof (not shown). The footer 1602 may be supported on the support surface directly (without intervening components) or indirectly (with intervening components, such as by way of non-limiting example roof flashing materials to prevent water penetration).

Figure 17:
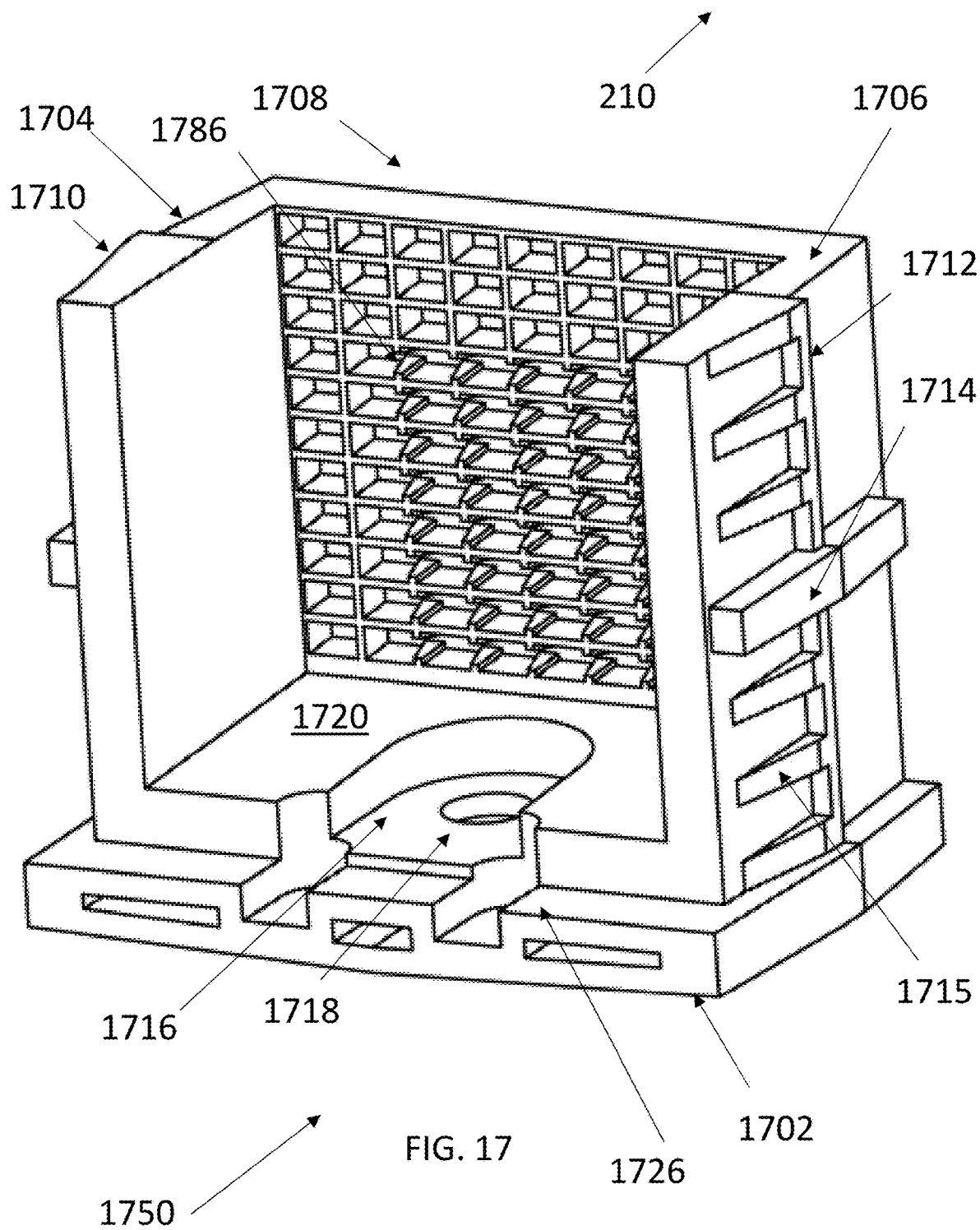
FIG. 17 is a perspective view of a cavity section of a footer according to an embodiment of the invention.
Figure 18:
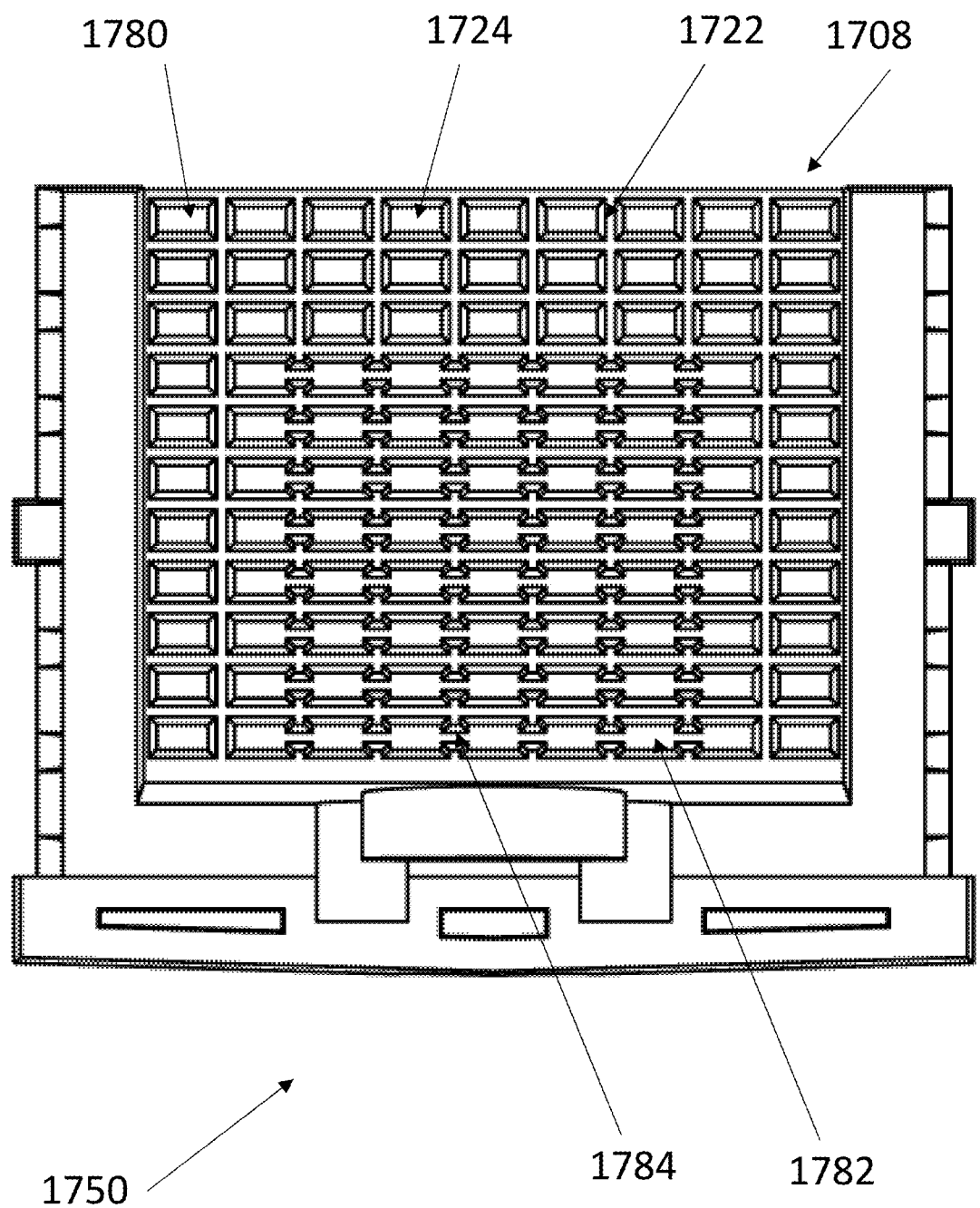
FIG. 18 is an interior view of a cavity section of a footer according to an embodiment of the invention.
Figure 19:
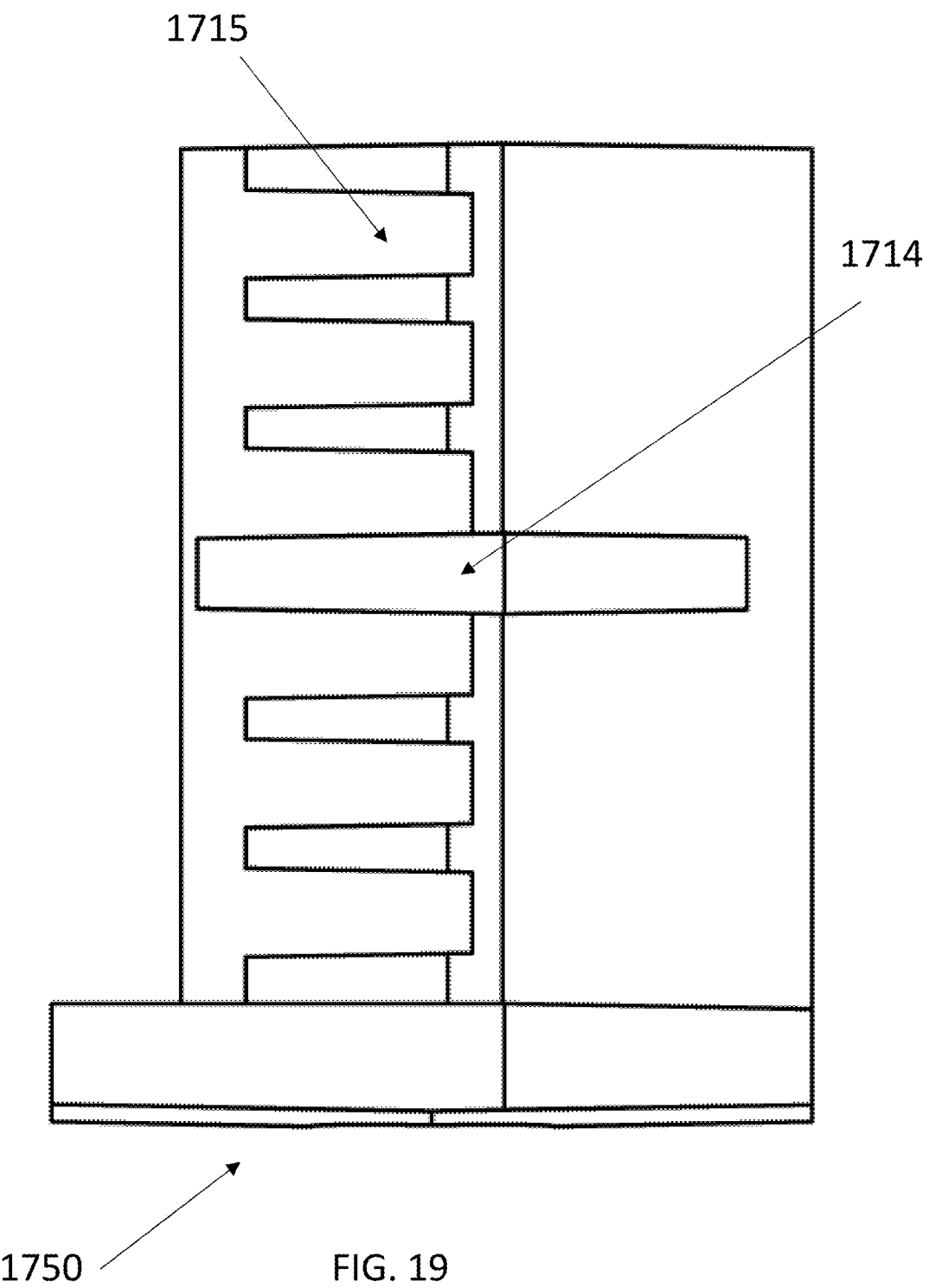
FIG. 19 is a side view of a cavity section of a footer according to an embodiment of the invention.
Figure 20:
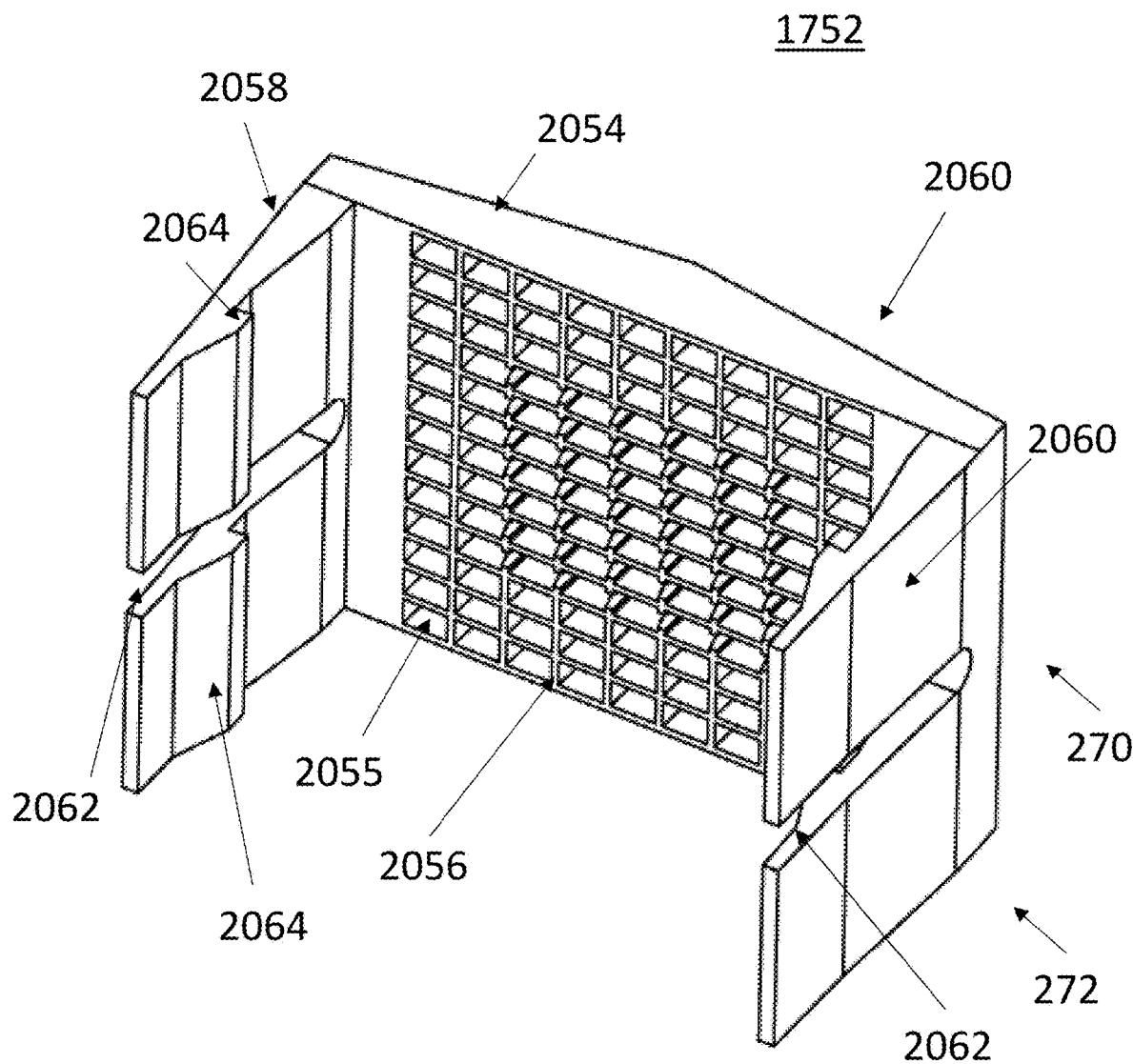
FIG. 20 is a perspective view of a cover section of a footer according to an embodiment of the invention.
Figure 21:
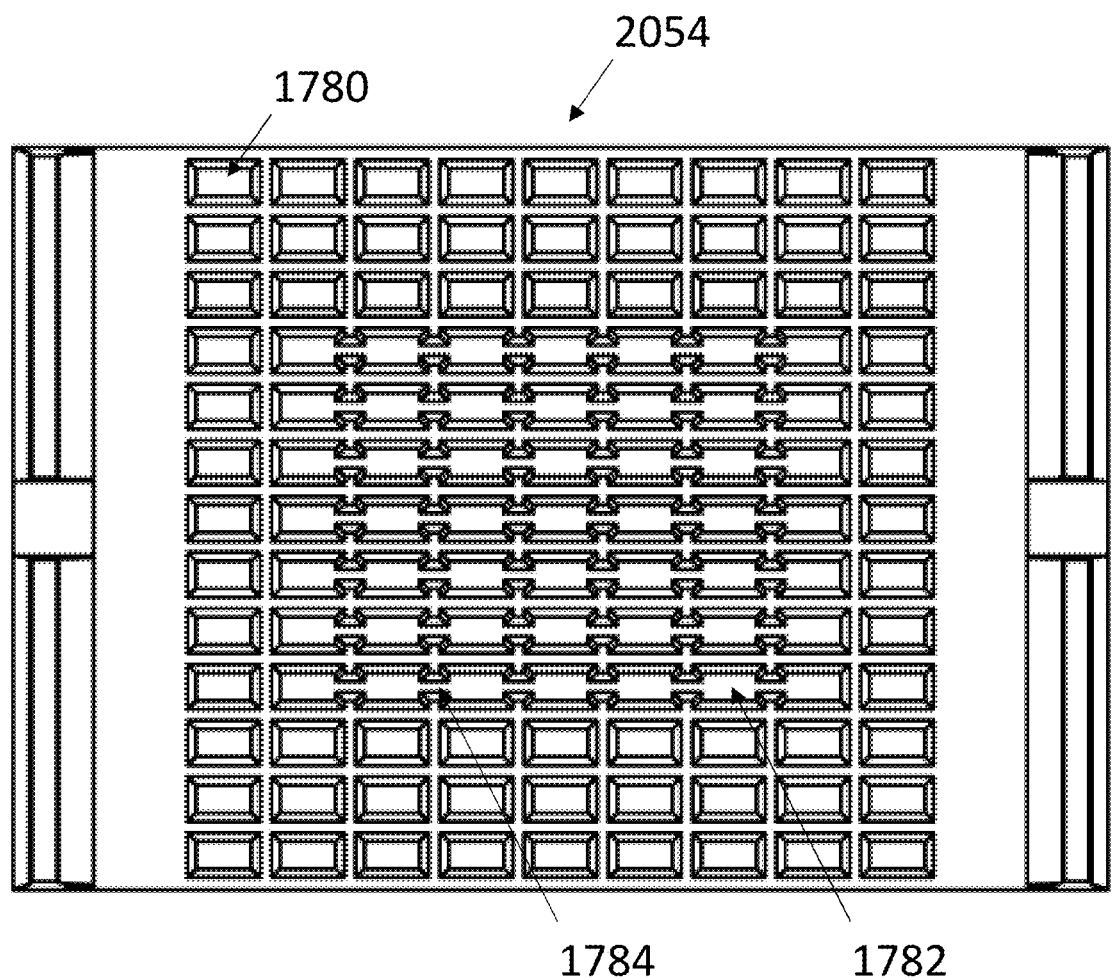
FIG. 21 is an interior view of a cover section of a footer according to an embodiment of the invention.
Figure 22:
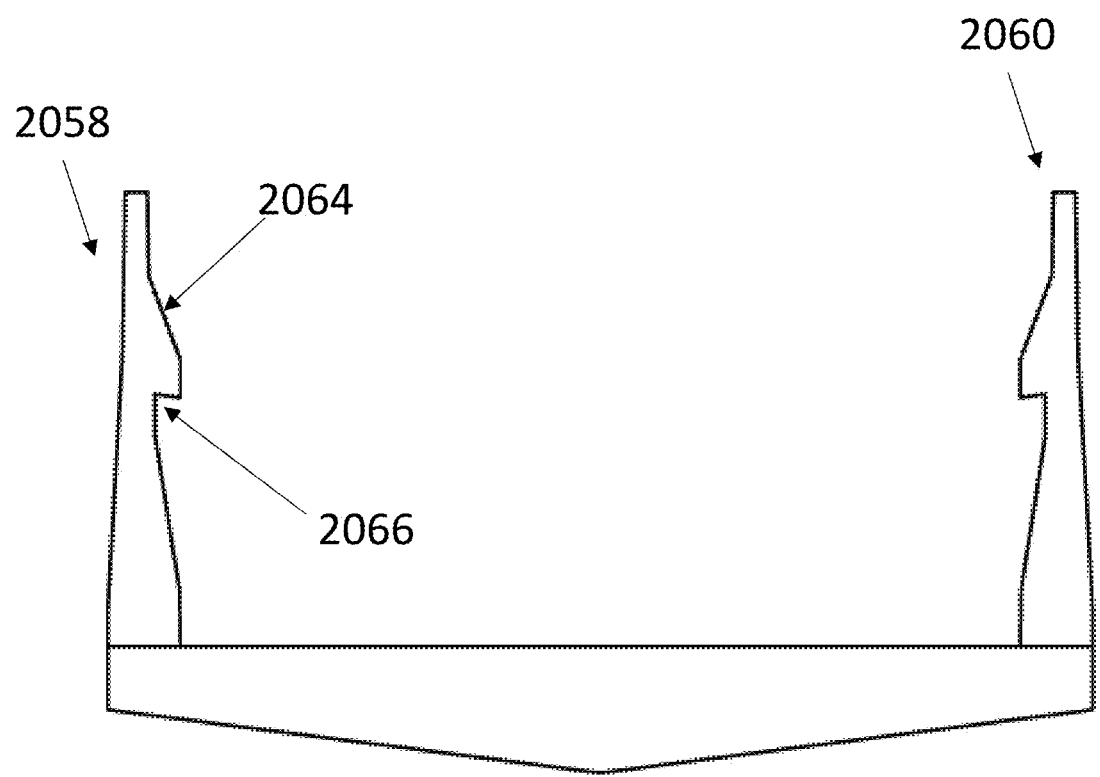
FIG. 22 is a top view of a cover section of a footer according to an embodiment of the invention.
Figure 23:
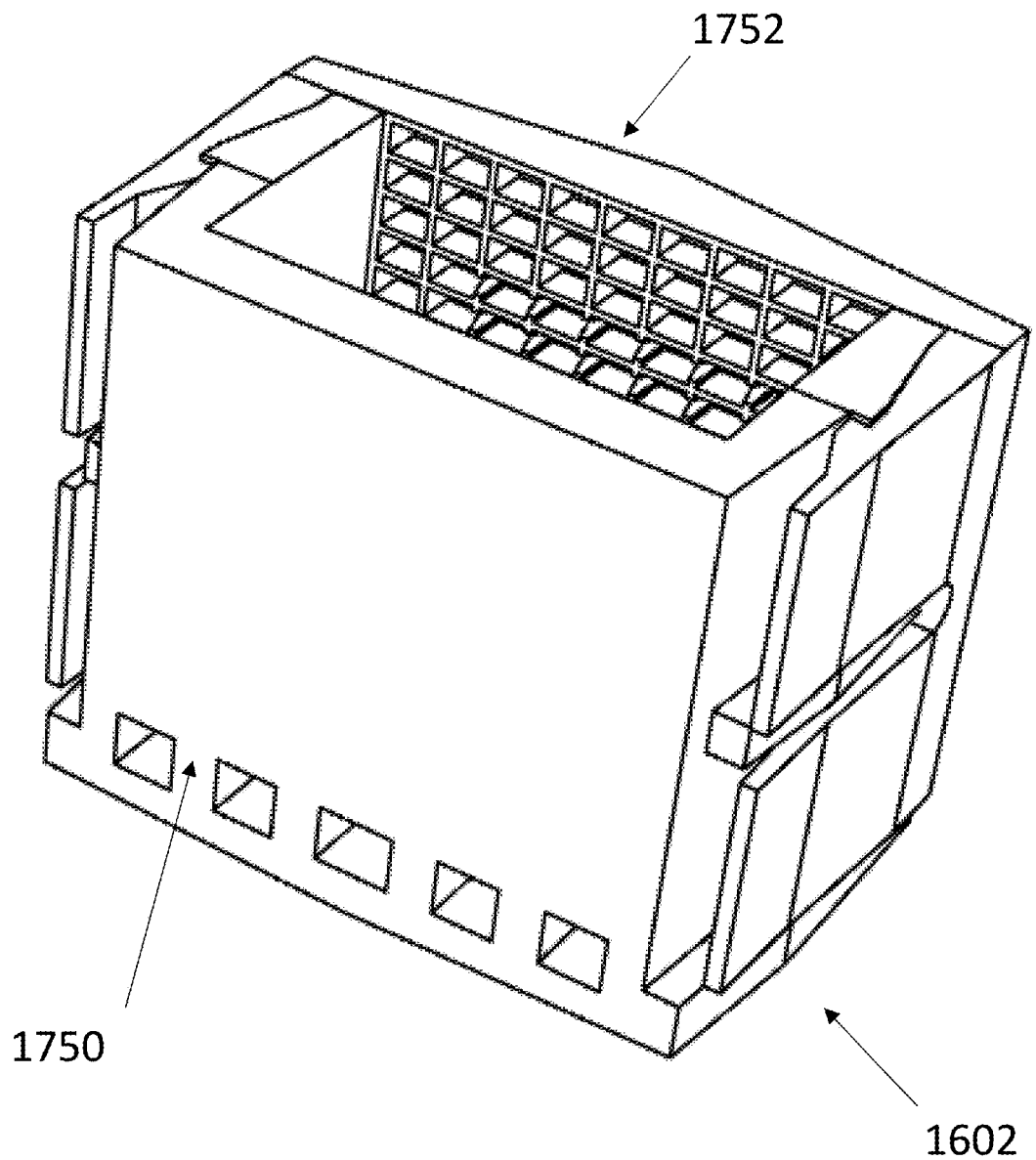
FIG. 23 is a perspective view of a footer configured in a closed position according to an embodiment of the invention.

Referring now to FIGS. 17-23, an embodiment of footer 1602 is shown in more detail. Footer 1602 includes a cavity section 1750 and a cover section 1752. FIGS. 17-19 show the cavity section 1750, FIGS. 20-22 show the cover section 1752, and FIG. 23 show both in their attached configuration to define footer 1602.

Referring now to FIGS. 17-19, cavity section 1750 has a base 1702, two lateral side walls 1704 and 1706, and a center wall 1708. Walls 1704, 1706 and 1708 are fixed relative to the base 1702, and may be integrally formed or attached thereto. The interior surfaces of walls 1704, 1706 and 1708 define an interior cavity 1720.

A first flange 1710 extends laterally from the side of wall 1704. A second flange 1712 extends laterally from the side of wall 1706. Each flange 1710 and 1712 has a depressible projection 1714 and ribs 1715. As discussed in more detail below, flanges 1710 and 1712 act as components of a latch that engage with cover section 1752, for which application of inward pressure on projections 1714 will move walls 1704 and 1706 inward to disengage the latch.

Base 1702 may have a recess 1716 and a central hole 1718 configured to receive lag bolt 1608 to secure footer 1602 into the support surface. Base 1702 may extend further forward that walls 1704 and 1706 to define a ledge 1726 that can support cover section 1752 as discussed below.

The inner side of wall 1708 is populated with a several patterns of grooves 1722 and projections 1724. The pattern may define a combination of frustums recesses 1780 and partial frustums recesses 1782 connected by cavities 1784. The partial frustums recess 1782 correspond to adjacent frustums in which the adjoining projections 1724 between frustums has been at least partially removed to define cavities 1784 between adjacent frustums. When partial frustum recess 1782 are in rows such as shown in the figures, the partial removal of the intervening projections 1724 defines wedge shapes 1786 along the top and bottom of each group of partial frustum recesses 1782. If the partial frustum recesses 1782 are aligned in columns (not shown), then wedge shapes 1786 would be along the lateral sides.

The embodiments herein show two end columns and three top rows of frustum recesses 1780 with the remainder of the pattern being partial frustum recesses 1782 and connecting cavities 1784, but the invention is not limited to any number or placement of the same.

Referring now to FIGS. 20-22, cover section 1752 is shown in an unassembled state independent from cavity section 1750. A cover wall 2054 has an inner side populated with a pattern of projections 2055 and/or grooves 2056. The pattern may define a combination of rows and columns of frustum recesses 1780 and/or partial frustum recesses 1782 as connected by cavities 1784. However, the invention is not limited to any specific patterns or shapes, and the pattern need not be identical to the pattern of wall 1708. For example, the pattern in FIGS. 20-22 has several rows of frustum recesses 1780 along the bottom of wall 2054, whereas the pattern of wall 1708 in cavity section 1752 does not.

Extensions 2058 and 2060 extend from cover wall 2054. As discussed in more detail below, when in a full assembled state, extensions 2058 and 2060 will engage flanges 1710 and 1712.

Recess 2062 extends through each of extensions 2058 and 2060. As discussed in more detail below, when in a full assembled state, recess 2062 align with projections 1714 of cavity section 250.

The inner side of extensions 2058 and 2060 each have a cam surface 2064 with an edge 2066.

Referring now to FIG. 23, cavity section 1750 and cover section 1752 are shown in their combined assembled state to form footer 1602. For the assembly, cover wall 2054 is aligned on ledge 1726. Applied pressure to cavity section 1750 and/or cover section 1752 pushes them toward each other. Projections 1714 slide into recess 2062, while cam surfaces 2064 slide along ribs 1715 to force extensions 2058 and 2060 outward. Eventually edges 2066 clear the end of flanges 1710 and 1712, releasing the applied pressure. Extensions 2058 and 2060 snap inward, engaging edges 2066 with the back of flanges 1710 and 1712 to lock cavity section 1750 and cover section 1752.

To release the components, inward pressure is applied to projections 1714 as exposed via recesses 2062. Walls 1704 and 1706 flex inward, releasing the engagement between edges 2066 with the back of flanges 1710 and 1712.

Referring now to FIGS. 24-27, an embodiment of intermediate support 1604 and upper support 1606 is shown in more detail.

Intermediate support 1604 includes a stem 2552 and an upper head portion 2570 that engages with upper support 1606.

Upper support includes a panel support surface 2402 and upper walls 2404 and 2406. Upper walls 2404 and 2406 extend upward from panel support surface 2402 to define a cavity 2408 there between. Two lower supports 2410 and 2412 extend downward from each panel support surface 2402. Referring specifically to FIG. 16, a solar panel 150 can be mounted on panel support surface 2402 and the adjacent wall 2404/2406, and secured in place via a barbed cap 314 inserted into cavity 2408.

Turning to intermediate support 1604, stem 2552 has at least four sides. Two opposing sides 2554 (only one side is shown) have a predetermined pattern of grooves 2556 and/or projections 2558 that are sized, shaped and positioned to mate with the projections and grooves of walls 1708 and 2054 of footer 1602. A non-limiting example is a pattern with a combination of individual frustum projections 2590 aligned in columns and rows along with a series of partial frustums projections 2592 connected by bridge projections 2594, although the invention is not limited to any particular shape.

The distance between the two opposing sides 2554, referred to for reference as the length, is such that when inserted into footer 1602 and cavity section 1750 locks onto cover section 1752, the pattern of sides 2554 will tightly mate with the pattern of the inner facing surfaces of walls 1708 and 2054, such that stem 2552 locks into position relative to footer 1602. When footer 1602 is secured by lag bolt 1608 to a support surface, then stem 2552 is effectively locked and mounted into place. Applied pressure to projections 1714 unlocks footer 1602 such that stem 2552 can removed.

The width of stem 2552 may be greater than its length, and in particular larger than the length of cavity 1720 when closed. With these size parameters, stem 2552 could only be locked into cavity 1720 when the patterns of sides 2554 and walls 1708 and 2054 are properly oriented toward each other. If stem 2552 were in a different orientation, the stem would be too big to fit into cavity 1720. This avoids insertion of stem 2552 at an improper orientation.

However the invention is not so limited, and other sizes could be used.

The width of stem 2552 may be smaller than the width of cavity 1720. This provides a degree of play and flexibility in the specific lateral placement in the width direction of stem 2552 within cavity 1720.

Stem 2552 may be height adjustable relative to footer 1602. When in its lowest position, stem 2552 may be largely within cavity 1720 while upper head portion 2470 is above footer 1602. The different patterns as discussed herein created predefined height positions for intermediate support 1704 relative to footer 1702.

Between the rows and the columns, there may be dozens of different combinations of pre-defined height/width positions to allow for custom placement of intermediate support 104 in footer 102.

The different patterns of projections and grooves may limit the scope of mating configurations between footer 1602 and intermediate support 1604. For the specific examples of FIGS. 16-25, frustum projections 2590 could insert in either frustum recess 1780 or partial frustum recess 1782. In contrast, partial frustum projections 2592 do not fit within frustum recesses 1780 as walls between frustum recess 1780 conflict with the bridge projections 2594. Groups of frustum projections 2592 can mate with corresponding size or larger size groups of partial frustum recesses 1782.

Figure 24:
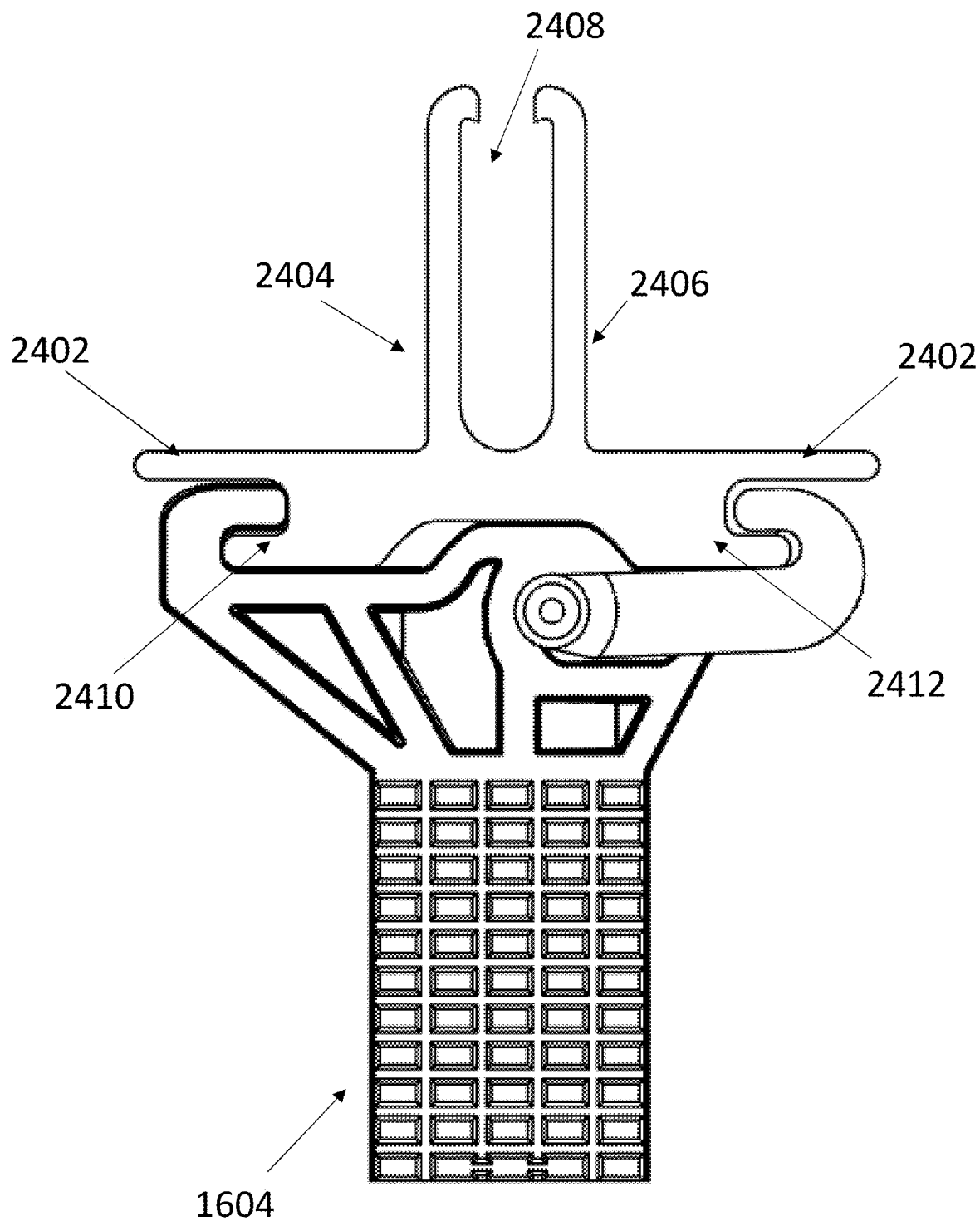
FIG. 24 is a side view of an intermediate support and upper support in a locked configuration according to an embodiment of the invention.

By way of example, when intermediate support 104 shown in FIG. 13 is used with footer 1602 having a pattern shown in FIG. 18, then intermediate support 104 could take any height position of the eleven rows, including only one overlapping row. In contrast, when intermediate support 1604 with the pattern shown in FIG. 24 is used with footer 1602 having a pattern shown in FIG. 18, the frustum recesses 1780 in the top three rows of wall 1708 would not accommodate the frustum projections 2592 in the bottom row of stem 2552, such that there would be at least four rows of overlap. Both combinations (FIGS. 13/18, 24/18) are viable, for which the noted combination with intermediate support 1604 guarantees a minimum of multiple overlapping rows with corresponding additional strength and stability in the connection. Of course, these are only non-limiting examples, and the patterns may be designed to accommodate other objectives.

Upper head portion 2570 extends laterally away from stem 2552 to define a first receiving cavity 2572 and support surfaces 2574. The size, shape and position of the first receiving cavity 2572 and support surfaces 2574 will accommodate lower supports 2410 and 2412 of the upper support 106.

A lock is provided by a moveable hook 2576 rotatably mounted on an axle 2578 extending through an slot 2580 in upper head portion 2570. Hook 2756 includes a pair of lateral arms 2702 that straddle the sides of upper head portion 2570 via a cavity 2704. A gasket 2708 fits into a receiving section 2706. The receiving section 2706 engages lower support 2412 and the corresponding support surface 2574 to lock the two together.

Figure 25:
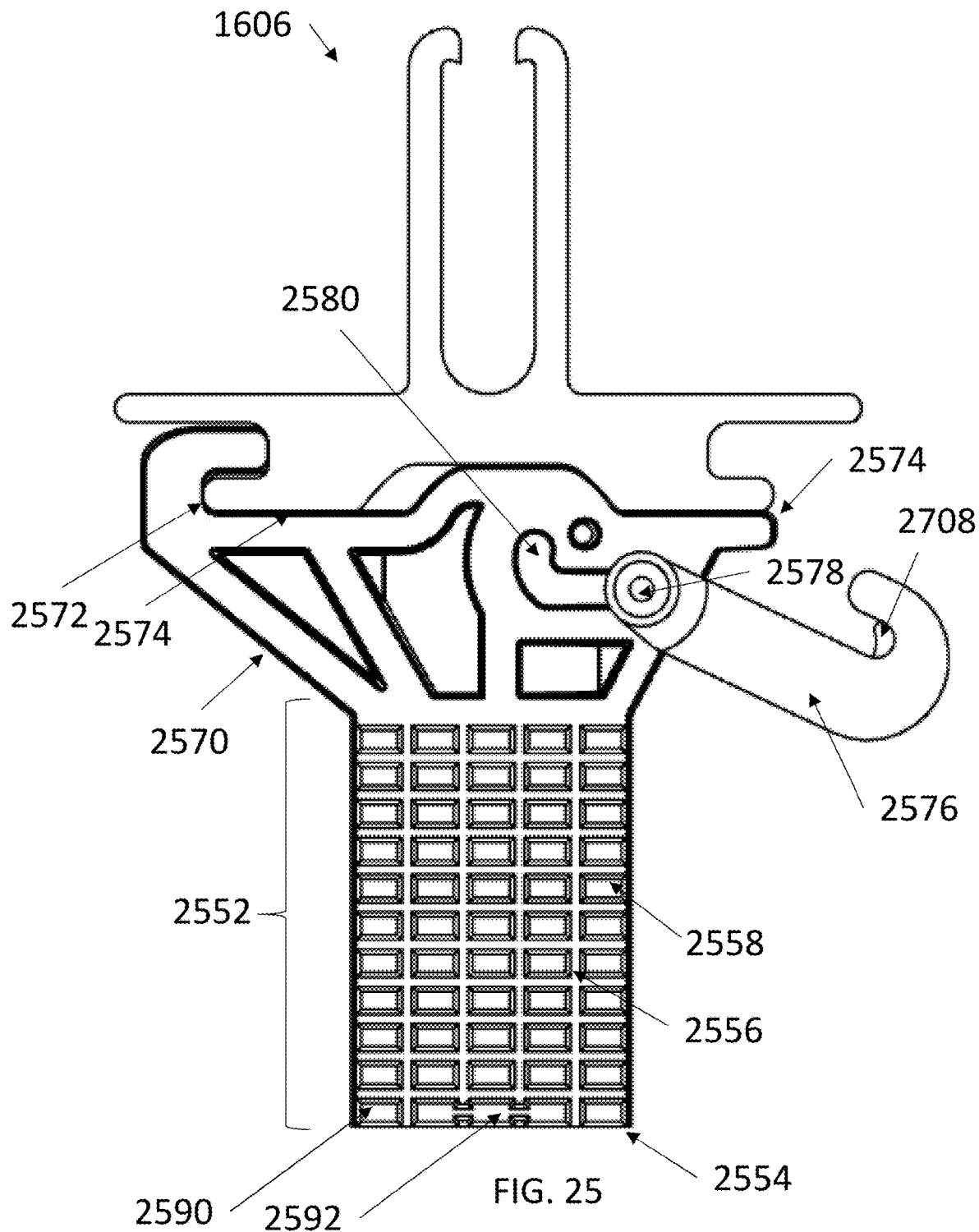
FIG. 25 is a side view of an intermediate support and upper support in an unlocked configuration according to an embodiment of the invention.
Figure 26:
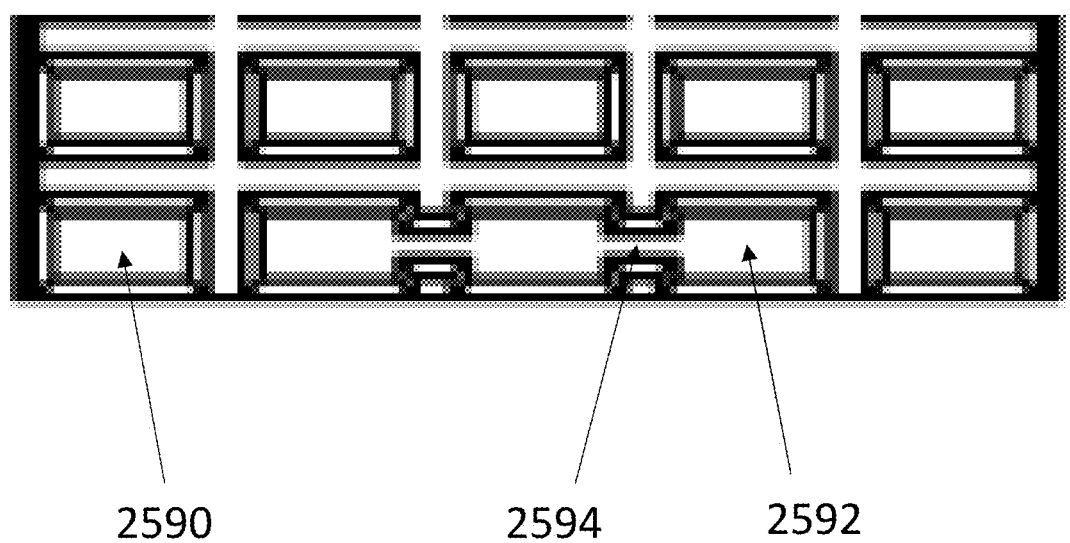
FIG. 26 is a side view of a portion of a pattern on an intermediate support according to an embodiment of the invention.
Figure 27:
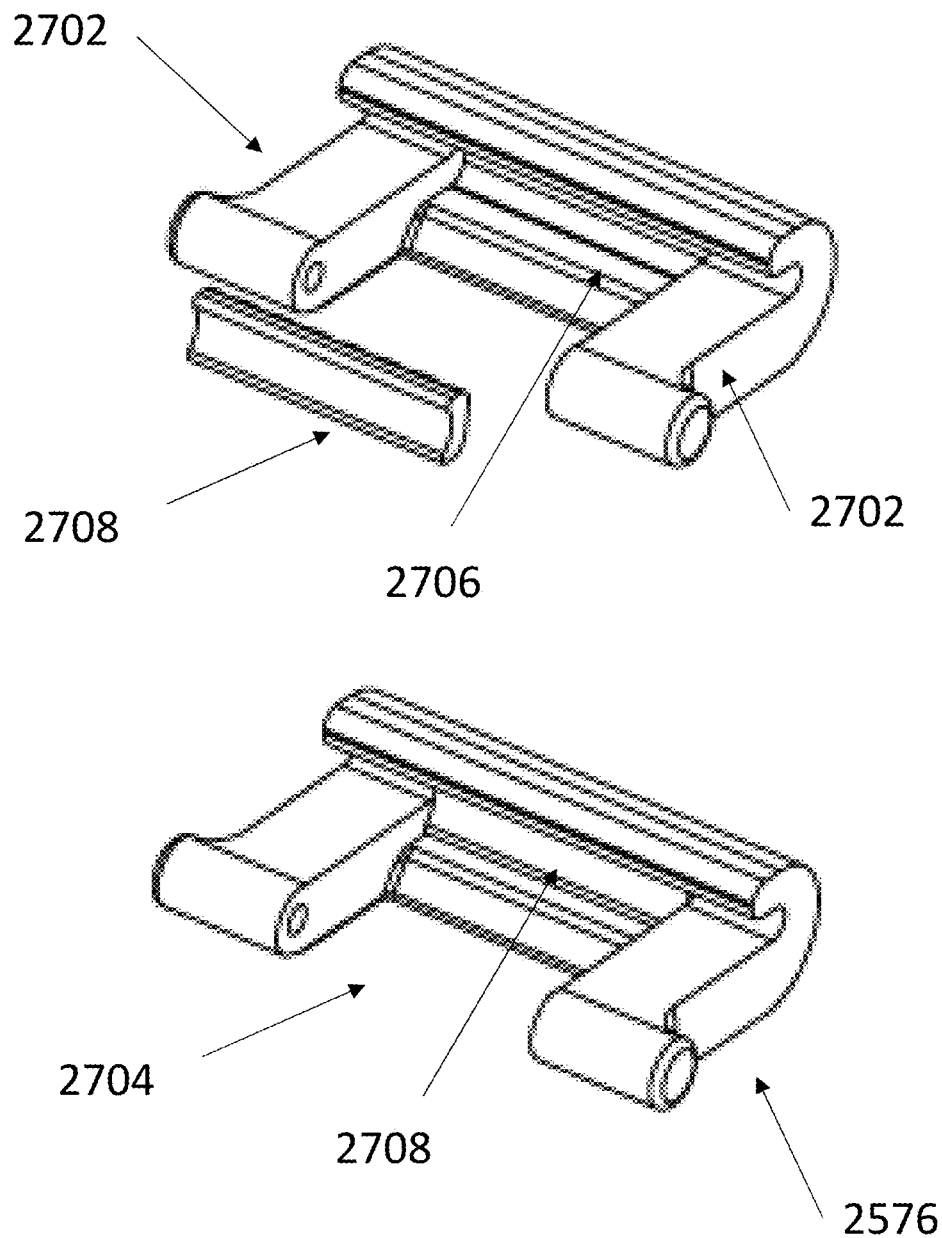
FIG. 27 shows perspective views of a hook according to an embodiment of the invention.

For installation, stem 2552 is placed inside cavity section 1750. With the hook 2576 in the open position as shown in FIG. 25, upper support 1606 is installed on upper head portion 2570 as shown in FIGS. 24 and 25 by inserting the lower support 2410 into first receiving cavity 2572. Hook 2576 is then locked into place as shown in FIG. 24, thereby attaching the upper support 1606 to the intermediate support 1604. The height and/or width positions of stem 2552 relative to footer 1602 is adjusted by hand to set the desired orientation, whereupon cover section 1752 is attached to lock the intermediate support 1604 in place. Once solar panel 150 is mounted on upper support 106, cap 314 is inserted into the cavity 2408 to hold 150 the panel in place.

For disassembly, hook 2754 can be moved to the position show in in FIG. 25 to unlock upper support 1606 from intermediate support 1604.

Figure 28:
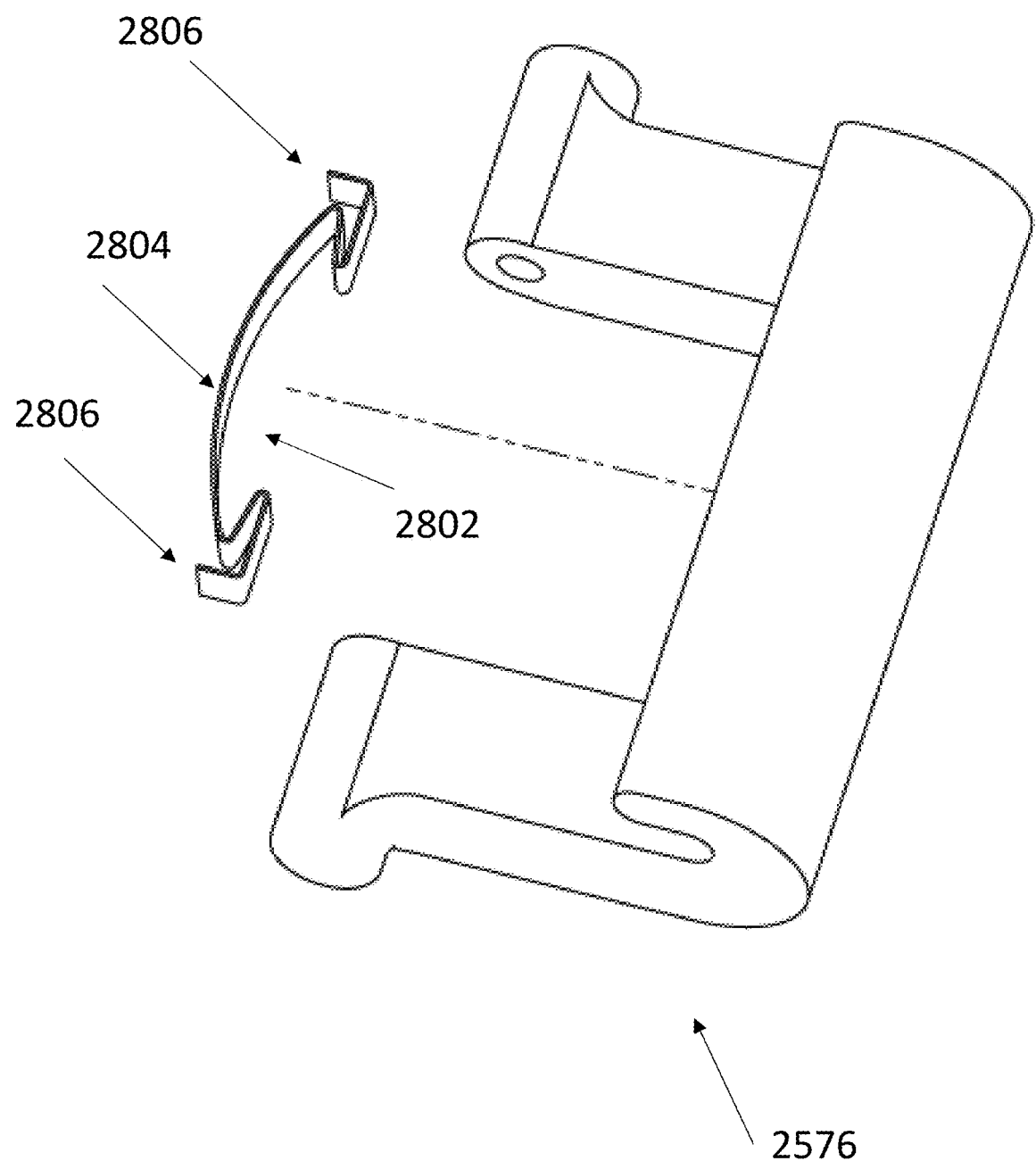
FIGS. 28-30 shows perspective views of a hook according to an embodiment of the invention.
Figure 29:
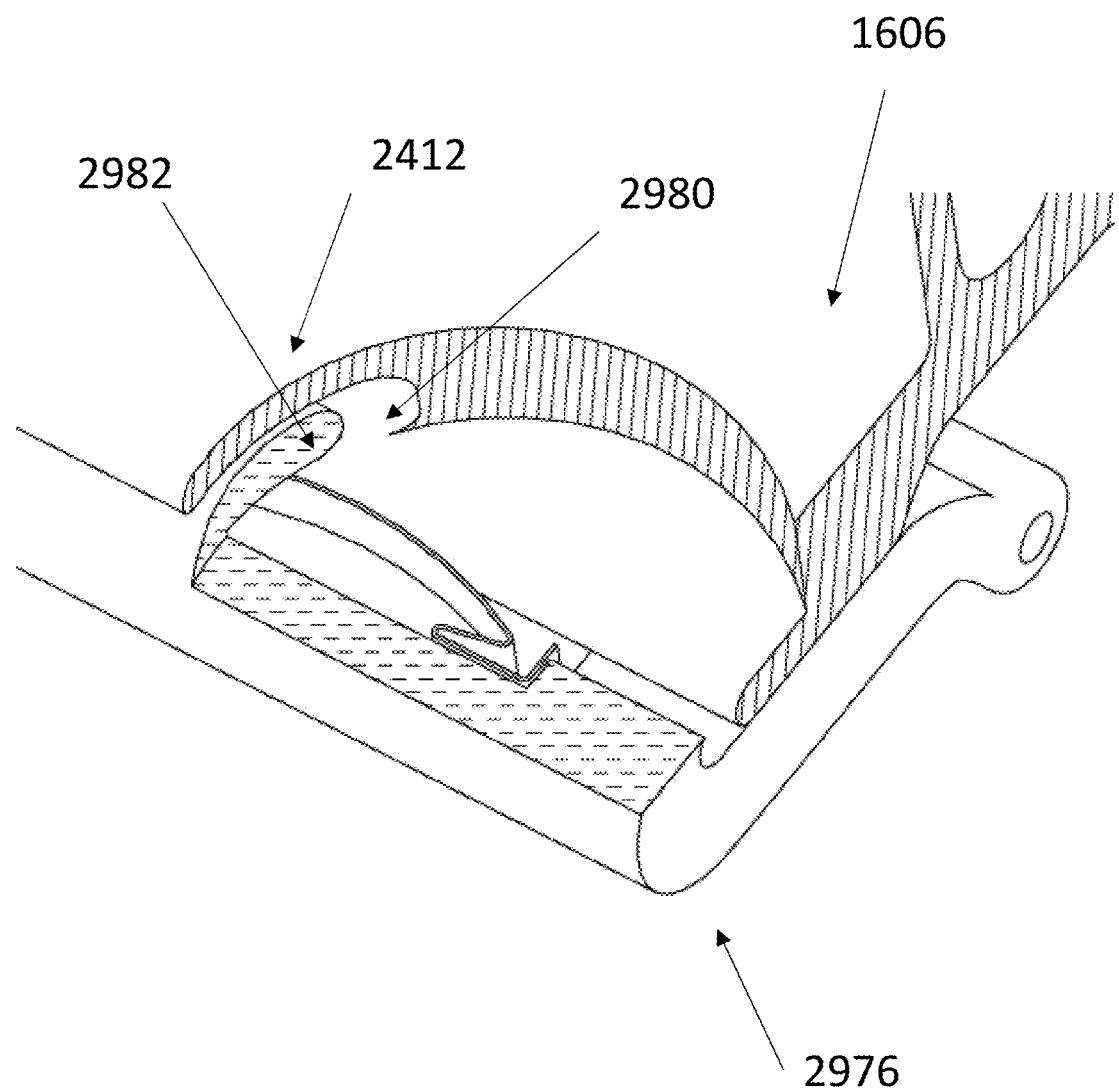
Figure 30:
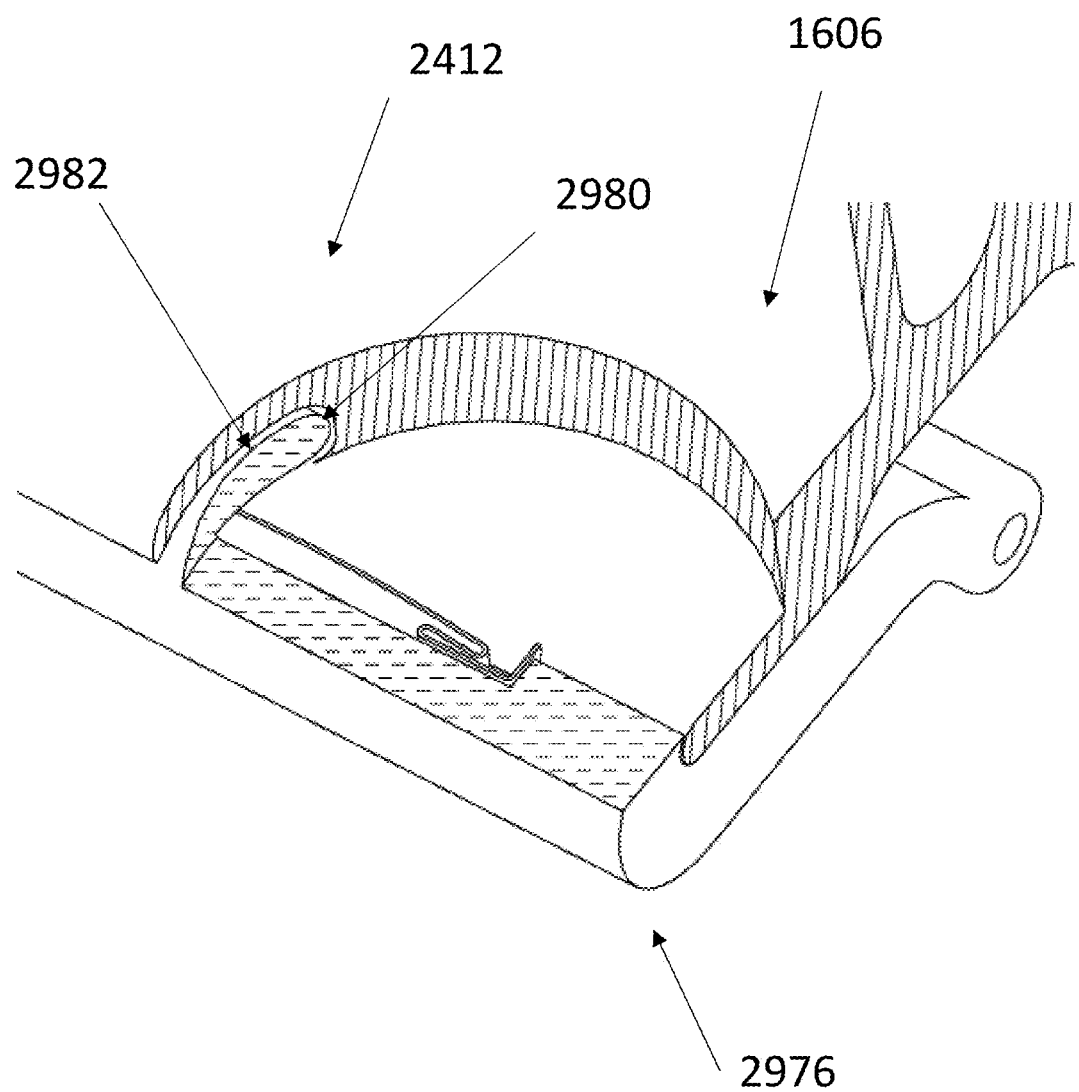

Referring now to FIGS. 28-30, another embodiment of hook 2754 is shown. In this embodiment, a spring 2802 is used rather than gasket 2708. Spring has a depressible face 2704 and two forward facing prongs 2706. Spring 2802 provides a spring force between hook 2576 and upper support 1606 by deforming when hook 2576 closes. The prongs 2706 may have a sharp edge (or edges) which penetrate or deform upper support 1606 when the hook 2754 is closed, creating a rigid connection between the components that prevents relative sliding.

In the above embodiments, hook 2756 covers both support surface 2574 and lower support 2412. However, the invention is not so limited. Another embodiment of a hook 2876 is shown in FIGS. 29 and 30. In this embodiment, lower support 2412 has a cavity 2980, and the hook end 2982 inserts into cavity 2980 as shown in FIG. 30. Cavity 2980 may be pre-formed in lower support 2412 during production or as a post-production modification. In the alternative, cavity 2980 may be formed by application of deforming pressure by hook end 2982, for which hook end 2982 may have an edge surface to facilitate penetration. FIG. 30 also shows prongs 2706 penetrating into upper support 1606 as discussed above.

The various patterns may be identical and symmetrical so that stem 2552 may be reversible when inserted into footer 1602. However, the patterns may be different, which may limit stem 2552 to one orientation for proper installation.

Embodiments herein are described as having grooves and projections to define mating patterns. The invention is not limited to any shape or layout of the patterns. By way of non-limiting example, grooves and projections can be reversed into projections and grooves. In an example, the embodiment of FIGS. 1-15 use frustum recesses on footer 102, whereas the embodiment of FIGS. 16-25 use frustum projections on footer 1602. In an alternative, frustum projections could be used footer 102, whereas frustum recess could be used on stem 2552. A particular footer could have a pattern of projections on one side and a pattern of grooves on the other. A common side may have combinations of projection and groove shapes. Any particular shape or design of the patterns permissible so long as the various surfaces can cooperate with each other.

The disclosed embodiments show various combinations of components. However, the invention is not so limited, and other combinations are possible. By way of non-limiting example, the clamping mechanism of FIGS. 1-15 could be used in the embodiment of FIGS. 16-25, and the intermediate support 104 could be used with other components of FIGS. 16-25. Any combination is permissible so long as the various surfaces can cooperate with each other.

The disclosed embodiments show various combinations of feature. However, the invention is not so limited, and amalgams are possible. By way of non-limiting example, an intermediate member could be made with the pattern of stem 2552 and the upper head portion 370, or with the pattern of stem 352 and the upper head portion 2570. The pattern on the stem may include one side with the pattern shown in FIG. 13, while the other side of the stem may have a different pattern such as shown in FIG. 24. Any combination is permissible so long as the various surfaces can cooperate with each other.

The disclosed embodiments are directed to supporting a solar panel on a roof. However, the design can be used to support any object on any fixed surface.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A mounting system, comprising:
a footer having a cavity section and a cover section;
the cavity section including:
a base and a first patterned wall extending upward from the base to at least partially define a cavity; and
at least one hole for receiving a connector to attach the footer to a fixed surface;
the cover section being releasably attachable to the cavity section and having a second patterned wall; and
an intermediate support having a stem and a head, at least two sides of the stem having a pattern of grooves and projections, the head having at least one support surface shaped to support an object and a lock configured to secure the object to the head;
wherein the first patterned wall, the second patterned wall and the pattern on the two sides of the stem collectively define a plurality of predefined height positions for the intermediate support to align relative to the footer;
wherein inserting the stem into the cavity section and then attaching the cover section to the cavity section locks the intermediate support to the footer by causing the first patterned wall and the second patterned wall to engage the pattern on the two sides of the stem.

2. The mounting system of claim 1, wherein the stem has a width smaller than a width of the cavity, such that the stem is adjustable in a width direction within the cavity when the cover section is unattached to the cavity section.

3. The mounting system of claim 1, wherein the first patterned wall, the second patterned wall and the pattern on the two sides of the stem collectively define a plurality of defined width positions for the intermediate support to align relative to the footer.

4. The mounting system of claim 1, wherein the stem has a width larger than a maximum length of the cavity when the footer is in an open configuration, such that that the stem cannot be locked into the cavity unless the width of the stem is aligned with a width of the footer.

5. The mounting system of claim 1, wherein the first and second patterned walls are defined by rows and columns of the projections separated by the grooves.

6. The mounting system of claim 5, wherein the projections and grooves of at least one of the first and second patterned walls at least partially define frustum recesses and/or frustum projections.

7. The mounting system of claim 5, wherein the projections and grooves of the at least one of the first and second patterned walls at least partially define partial frustum recesses and/or frustum projections that are adjacent and connected with cavities and/or bridges, respectively.

8. The mounting system of claim 1, wherein an upper portion of the head of the intermediate support has a width larger than a width of the stem.

9. The mounting system of claim 1, wherein an upper portion of the head of the intermediate support has a first cavity, the at least one support surface, and the lock.

10. The mounting system of claim 9, wherein the lock is a hook having a base mounted in a slot of the intermediate support.

11. The mounting system of claim 9, further comprising:
an upper support configured to receive the object;
first and second projections extending from a base of the upper support; and the first and second projections having shapes that mate with the upper portion of the intermediate support and are lockable in place by the lock.

12. The mounting system of claim 11, further comprising an assembled configuration in which the base of the footer is secured to a supporting surface, the stem of the intermediate support is locked into the footer, the upper support is locked into the intermediate support by the lock, and the object is mounted on the upper support, the object being at least one solar panel.

13. The mounting system of claim 1, wherein the cover section and the cavity section have mating portions of at least one latch, such that when in proper orientation moving the cover section toward the cavity section latch together.

14. The mounting system of claim 13, wherein inward pressure applied at an accessible point of the cavity section releases the at least one latch.

15. The mounting system of claim 1, further comprising:
a pin extending through a slot in the cavity section and a slot in the cover section, the pin having a head and shaft;
a cam lever rotatably mounted on an end of the pin, and rotatable between an open position and a closed position, the cam lever having a cam surface facing the cover section; and
the cam lever and the pin at least partially attaching the cavity section to the cover section.

16. The mounting system of claim 15, wherein the pin is flat.

17. The mounting system of claim 15, wherein rotation of the cam lever to the closed position pulls the head of the pin against the cavity section to forcibly abut the cavity section against the cover section, to thereby define a closed configuration of the footer.

18. The mounting system of claim 15, wherein rotation of the cam lever to the open position pushes the head of the pin away from the cavity section to allow the cavity section to move relative to the cover section, to thereby define an open configuration of the footer.

19. The mounting system of claim 15, wherein the head of the pin acts as a stop that limits a maximum separation of the cover section from the cavity section when the footer is in an open configuration.

20. The mounting system of claim 1, wherein the pattern on the at least two sides of the stem is non-uniform.

* * * * *